United States Patent
Obonai et al.

(10) Patent No.: US 9,064,637 B2
(45) Date of Patent: Jun. 23, 2015

(54) DYE-SENSITIZED SOLAR CELL

(75) Inventors: Naohiro Obonai, Tokyo-to (JP); Ryo Fujiwara, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 0 days.

(21) Appl. No.: 13/389,887

(22) PCT Filed: Jul. 6, 2010

(86) PCT No.: PCT/JP2010/061488
§ 371 (c)(1), (2), (4) Date: Feb. 10, 2012

(87) PCT Pub. No.: WO2011/058786
PCT Pub. Date: May 19, 2011

(65) Prior Publication Data
US 2012/0138118 A1    Jun. 7, 2012

(30) Foreign Application Priority Data
Nov. 16, 2009   (JP) ................................ 2009-261158

(51) Int. Cl.
*H01G 9/20*      (2006.01)

(52) U.S. Cl.
CPC ........... *H01G 9/2077* (2013.01); *H01G 9/2009* (2013.01); *H01G 9/2031* (2013.01); *H01G 9/2059* (2013.01); *H01G 9/2095* (2013.01); *Y02E 10/542* (2013.01)

(58) Field of Classification Search
CPC ...... Y02E 10/542; H01G 9/08; H01G 9/2077; H01G 9/2009; H01G 9/12; H01G 9/025; H01G 9/2031; H01G 9/2095
USPC .......................................................... 136/250
See application file for complete search history.

(56) References Cited

U.S. PATENT DOCUMENTS

| | | | |
|---|---|---|---|
| 2003/0140963 A1* | 7/2003 | Yamanaka et al. | 136/263 |
| 2003/0230337 A1* | 12/2003 | Gaudiana et al. | 136/256 |
| 2005/0199279 A1* | 9/2005 | Yoshimine et al. | 136/251 |
| 2010/0243022 A1 | 9/2010 | Hoshi et al. | |

FOREIGN PATENT DOCUMENTS

| | | | |
|---|---|---|---|
| JP | 2004-296203 A | 10/2004 | |
| JP | 2005-243388 A | 9/2005 | |

(Continued)

OTHER PUBLICATIONS

International Search Report: mailed Sep. 14, 2010 PCT/JP2010/061488.

*Primary Examiner* — Marla D McConnell
(74) *Attorney, Agent, or Firm* — Ladas & Parry LLP

(57) ABSTRACT

A dye-sensitized solar cell includes a base material that functions as an electrode, has flexibility, and has a porous layer, containing a dye-sensitizer-supported fine particle of a metal oxide semiconductor on one surface thereof. A counter electrode base material is arranged to oppose the base material for dye sensitized solar cell, functions as an electrode, and has flexibility. A solid electrolyte layer is provided between the base material for dye-sensitized solar cell and the counter electrode base material and contacts the porous layer. Among the base materials, at least one has transparency; and at least one has an insulating layer provided on a surface thereof. The insulating layer is provided in a region a region where the porous layer is formed, and where the base materials are opposed to each other. The insulating layer has an external communication portion that leads from an inside of the porous layer-forming region to outside.

5 Claims, 11 Drawing Sheets

(56) References Cited

FOREIGN PATENT DOCUMENTS

| | | |
|---|---|---|
| JP | 2005-251605 A | 9/2005 |
| JP | 2006-286534 A | 10/2006 |
| JP | 2006-331791 A | 12/2006 |
| JP | 2007-265776 A | 10/2007 |
| JP | 2008-176993 A | 7/2008 |
| JP | 2009-238571 A | 10/2009 |
| WO | 2009/057704 A1 | 5/2009 |

* cited by examiner

DYE-SENSITIZED SOLAR CELL

TECHNICAL FIELD

The present invention relates to a dye-sensitized solar cell that has flexibility and is free from problems such as a short circuit.

BACKGROUND ART

In recent years, environmental issues such as global warming believed to be caused by an increase in carbon dioxide have become serious, and therefore measures against such environmental issues have been taken on a global basis. Above all, solar cells utilizing the energy of sunlight have been actively researched and developed as environmentally-friendly clean energy sources. As such solar cells, monocrystal silicon solar cells, polycrystal silicon solar cells, amorphous silicon solar cells, and compound-semiconductor solar cells have already been practically used, but these solar cells have problems such as high production cost etc. For this reason, dye-sensitized solar cells have received attention as solar cells that are environmentally friendly and can be produced at lower cost, and research and development of such dye-sensitized solar cells have been promoted.

An example of the general structure of a dye-sensitized solar cell is shown in FIG. 11. As shown in FIG. 11, a general dye-sensitized solar cell 100 has a structure comprising: abase material for dye-sensitized solar cell 110 having a base material 111 and a first electrode layer 112 laminated on the base material 111, and a counter electrode base material 120 that functions as an electrode, and a porous layer 102 containing dye sensitizer-supported fine particles of a metal oxide semiconductor and an electrolyte layer 101 provided inside a sealant 103 and interposed between the base material for dye-sensitized solar cell 110 and the counter electrode base material 120. Therefore, the dye sensitizer adsorbed to the surface of the metal oxide semiconductor fine particles contained in the porous layer 102 is excited by receiving sunlight from the base material 111 side, and excited electrons are transferred to the first electrode layer and then transferred to the counter electrode base material through an external circuit. Then, the electrons are returned to the ground state of the dye sensitizer by a redox couple so that electricity is generated.

Such a dye-sensitized solar cell conventionally uses a glass substrate as a base material. However, in recent years, there has been a demand for flexible dye-sensitized solar cells, and therefore the use of a flexible substrate as a base material has been contemplated. However, when a flexible base material is used, there is a problem that the base material is bent and therefore an internal short circuit is caused by electrical contact between the first electrode layer and the counter electrode base material.

In order to solve such a problem, for example, Patent Literatures 1 and 2 disclose that a separator, such as an insulating porous film, is provided between a counter electrode layer and a power-generating layer composed of a porous layer and an electrolyte layer to prevent a short circuit. Further, Patent Literature 3 discloses that a spacer is provided on a counter electrode layer to prevent a short circuit. All the electrolytes used in Patent Literatures 1 to 3 are liquid.

However, a dye-sensitized solar cell having an electrolyte layer using such a liquid electrolyte has the problem of high production cost because the electrolyte layer usually needs to be sealed with an expensive sealant having high resistance to iodine contained in the electrolyte, and further has a problem that, even when the electrolyte layer is sealed with such a sealant, there is a possibility that liquid leakage from the electrolyte layer occurs. Further, as described above, since the production of such a dye-sensitized solar cell having an electrolyte layer using a liquid electrolyte requires sealing with a sealant, alignment between a base material for dye-sensitized solar cell and a counter electrode base material for bonding requires high accuracy. Further, in such a dye-sensitized solar cell, the sealant needs to be provided outside a region where a porous layer is provided, and therefore adjustment of the formation position of each of the members of the dye-sensitized solar cell also requires high accuracy. Therefore, such a dye-sensitized solar cell has a problem that its production process is complicated.

In order to solve such problems, a dye-sensitized solar cell having a solid electrolyte layer using a solid electrolyte instead of such a liquid electrolyte as described above has been studied. Such a dye-sensitized solar cell having a solid electrolyte layer uses a solid electrolyte having no fluidity, and therefore can be produced at low cost without sealing the solid electrolyte layer with such an expensive sealant as described above. The use of such a solid electrolyte also makes it possible to solve the problem of liquid leakage from an electrolyte layer. Further, as described above, since it is not necessary to perform sealing with a sealant, alignment between a base material for dye-sensitized solar cell and a counter electrode base material for bonding and adjustment of the formation position of each of the members of the dye-sensitized solar cell do not require high accuracy. This eliminates the above-described complications associated with the production of a dye-sensitized solar cell using a liquid electrolyte and makes it easy to produce a dye-sensitized solar cell.

Such a dye-sensitized solar cell using a solid electrolyte layer is also required to use a flexible base material.

When such a dye-sensitized solar cell using a solid electrolyte layer uses a flexible base material, a base material for dye-sensitized solar cell and a counter electrode base material can be separated from each other by a laminated body composed of the solid electrolyte layer and a porous layer, which is advantageous in that the necessity to use a member such as the above-described separator or spacer can be eliminated.

However, such a dye-sensitized solar cell using a solid electrolyte layer has a problem that there is a possibility that an internal short circuit occurs due to contact between the base material for dye-sensitized solar cell and the counter electrode base material in a region surrounding the porous layer. In order to solve such a problem, for example as shown in FIG. 12, a dye-sensitized solar cell in which a base material for dye-sensitized solar cell 1 and a counter electrode base material 2 are not opposed to each other around a porous layer 4 has also been studied. However, in this case, there is a problem that alignment between the base material for dye-sensitized solar cell and the counter electrode base material for bonding requires high accuracy, which complicates the production process of the dye-sensitized solar cell. It is to be noted that a detailed description of FIG. 12 will be made later.

CITATION LIST

Patent Literature

Patent Literature 1: Japanese Patent Application Laid-Open (JP-A) No. 2005-243388
Patent Literature 2: JP-A No. 2006-331791
Patent Literature 3: JP-A No. 2004-296203

SUMMARY OF INVENTION

Technical Problem

It is a major object of the present invention to provide a dye-sensitized solar cell that does not cause problems such as a short circuit even when a flexible base material is used and a dye-sensitized solar cell production method that is capable of easily producing such a dye-sensitized solar cell at low cost.

Solution to Problem

In order to achieve the above object, the present invention provides a dye-sensitized solar cell comprising: a base material for dye-sensitized solar cell that functions as an electrode, has flexibility, and has a porous layer, containing a dye-sensitizer-supported fine particle of a metal oxide semiconductor, provided on one surface of the base material for dye-sensitized solar cell; a counter electrode base material that is arranged so as to oppose to the base material for dye-sensitized solar cell, functions as an electrode, and has flexibility; and a solid electrolyte layer that is provided between the base material for dye-sensitized solar cell and the counter electrode base material so as to come into contact with the porous layer, wherein at least one of the base material for dye-sensitized solar cell and the counter electrode base material has transparency; at least one of the base material for dye-sensitized solar cell and the counter electrode base material has an insulating layer provided on a surface thereof; the insulating layer is provided in a region which surrounds a porous layer-forming region where the porous layer is formed, and which is where the base material for dye-sensitized solar cell and the counter electrode base material are opposed to each other; and the insulating layer has an external communication portion that leads from an inside of the porous layer-forming region to outside.

According to the present invention, by providing the insulating layer, it is possible to prevent contact between the base material for dye-sensitized solar cell and the counter electrode base material in a region which surrounds the porous layer-forming region and where both the base materials are opposed to each other. This makes it possible to prevent the occurrence of a short circuit in the dye-sensitized solar cell.

Further, according to the present invention, by providing the solid electrolyte layer using an electrolyte having no fluidity, it is possible to eliminate the necessity to seal the solid electrolyte layer with an expensive sealant having high resistance to iodine. This allows the dye-sensitized solar cell to be produced at low cost.

Further, according to the present invention, since the solid electrolyte layer and the insulating layer are provided, adjustment of the formation position of each of the members and alignment between the base material for dye-sensitized solar cell and the counter electrode base material for bonding during the production of the dye-sensitized solar cell do not require high accuracy. This allows the dye-sensitized solar cell to be easily produced.

Further, according to the present invention, by providing the external communication portion in a region surrounding the porous layer, it is possible to discharge air in the dye-sensitized solar cell through the external communication portion when the base material for dye-sensitized solar cell and the counter electrode base material are bonded together in the step of bonding them together during the production of the dye-sensitized solar cell. This allows the dye-sensitized solar cell to be easily produced.

According to the present invention, it is preferred that the base material for dye-sensitized solar cell is composed of a metal foil and the counter electrode base material has transparency. When the base material for dye-sensitized solar cell is composed of a metal foil, the porous layer can be directly formed on the base material for dye-sensitized solar cell by burning. This allows the dye-sensitized solar cell to achieve good adhesion between the base material for dye-sensitized solar cell and the porous layer.

Further, when the dye-sensitized solar cell has a structure in which the base material for dye-sensitized solar cell is composed of a metal foil and the counter electrode base material has transparency (hereinafter, sometimes referred to as an "inverted structure"), light enters the porous layer through the solid electrolyte layer, and therefore there is a concern about the loss of light in the solid electrolyte layer. Therefore, the thickness of the solid electrolyte layer is preferably reduced, but a reduction in the thickness of the solid electrolyte layer narrows the gap between the two base materials, which increases the risk of a short circuit between the electrodes. For this reason, in the case of such an inverted-structure dye-sensitized solar cell, the use of the insulating layer used in the present invention is preferred.

According to the present invention, it is also preferred that the insulating layer has tackiness. This makes it possible to previously perform, for example, temporal bonding between the base material for dye-sensitized solar cell and the counter electrode base material by using the insulating layer so that a desired positional relationship between the base material for dye-sensitized solar cell and the counter electrode base material can be achieved when they are bonded together. This allows the dye-sensitized solar cell to achieve high quality.

According to the present invention, it is also preferred that the porous layer-forming region is quadrilateral and the insulating layer is provided along the two opposite sides of the porous layer-forming region.

Such a shape of the dye-sensitized solar cell is suitable for mass production, and mass production of the dye-sensitized solar cell can be achieved by, for example, a Roll-to-Roll method.

The present invention is also directed to a dye-sensitized solar cell module comprising the above-described two or more dye-sensitized solar cells connected together.

According to the present invention, the use of the above-described dye-sensitized solar cells makes it possible to prevent the occurrence of an internal short circuit in the dye-sensitized solar cell module.

The present invention also provides a method for producing a dye-sensitized solar cell comprising the steps of: first preparing a base material for dye-sensitized solar cell that functions as an electrode, has flexibility, and has a porous layer, containing a dye-sensitizer-supported fine particle of a metal oxide semiconductor, provided on one surface of the base material for dye-sensitized solar cell, and a counter electrode base material that is arranged so as to oppose to the base material for dye-sensitized solar cell, functions as an electrode, and has flexibility; then forming the porous layer on the base material for dye-sensitized solar cell; forming a solid electrolyte layer so as to come into contact with the porous layer; forming an insulating layer on a surface of at least one of the base material for dye-sensitized solar cell and the counter electrode base material in a region which surrounds a region corresponding to a porous layer-forming region where the porous layer is formed, and which is where the base material for dye-sensitized solar cell and the counter electrode base material are opposed to each other when they are bonded together; and then bonding together the base material for dye-sensitized solar cell and the counter electrode base material opposed to each other with the porous layer and the solid electrolyte layer being interposed therebetween, wherein at least one of the base material for dye-sensitized solar cell and the counter electrode base material has transparency and the porous layer-forming step, the solid electrolyte layer-forming step, and the insulating layer-forming step are performed in no particular order.

According to the present invention, it is possible to easily produce a dye-sensitized solar cell that does not cause an internal short circuit.

Further, according to the present invention, since a solid electrolyte layer and an insulating layer are formed in the solid electrolyte layer-forming step and the insulating layer-forming step, alignment between the base material for dye-sensitized solar cell and the counter electrode base material for bonding in the bonding step does not require high accuracy. This makes it easy to produce a dye-sensitized solar cell.

Further, the method according to the present invention does not include the step of sealing an electrolyte layer with a sealant. This makes it easy to produce a dye-sensitized solar cell as compared to a conventional method for producing a dye-sensitized solar cell in which a base material for dye-sensitized solar cell having a porous layer provided thereon and a counter electrode base material are sealed with a sealant and then an electrolyte layer is formed by injecting an electrolyte.

According to the present invention, it is preferred that a metal foil is used as the base material for dye-sensitized solar cell, a base material having transparency is used as the counter electrode base material, and in the porous layer-forming step, the porous layer is formed by burning. This is because good adhesion between the base material for dye-sensitized solar cell and the porous layer can be achieved and, in the case of an inverted-structure dye-sensitized solar cell using a metal foil as a base material for dye-sensitized solar cell, an insulating layer formed in the insulating layer-forming step can effectively perform its function and have a great effect.

Further, according to the present invention, it is also preferred that, in the insulating layer-forming step, the insulating layer is formed by applying a composition for forming an insulating layer in a pattern onto at least one of the base material for dye-sensitized solar cell and the counter electrode base material or by using a tape having insulating properties. This allows the insulating layer to be easily formed on at least one of the base material for dye-sensitized solar cell and the counter electrode base material.

Further, according to the present invention, it is also preferred that: the porous layer is formed by applying a composition for forming a porous layer in a pattern onto the base material for dye-sensitized solar cell in the porous layer-forming step; the solid electrolyte layer is formed by applying a composition for forming a solid electrolyte layer in a pattern onto the porous layer in the solid electrolyte layer-forming step; and the insulating layer is formed by applying a composition for forming an insulating layer in a pattern onto at least one of the base material for dye-sensitized solar cell and the counter electrode base material in the insulating layer-forming step. By performing all the porous layer-forming step, the solid electrolyte layer-forming step, and the insulating layer-forming step by an application method in such a manner as described above, it is possible to produce a dye-sensitized solar cell on a single production line and therefore to improve production efficiency. Further, both the base material for dye-sensitized solar cell and the counter electrode base material used in the present invention have flexibility, and therefore by performing all these steps by an application method, it is possible to reduce loads applied to the base material for dye-sensitized solar cell and the counter electrode base material as compared to a case where a tape or the like is used and therefore to prevent a reduction in processing accuracy.

Advantageous Effects of Invention

The dye-sensitized solar cell according to the present invention comprises the insulating layer, and therefore contact between the base material for dye-sensitized solar cell and the counter electrode base material can be prevented even when flexible base materials are used as these base materials. This makes it possible to prevent the occurrence of a short circuit in the dye-sensitized solar cell.

Further, the dye-sensitized solar cell according to the present invention comprises the insulating layer and the solid electrolyte layer, and therefore adjustment of the formation position of each of the members of the dye-sensitized solar cell and alignment between the base material for dye-sensitized solar cell and the counter electrode base material for bonding do not require high accuracy. This allows the dye-sensitized solar cell to be easily produced.

DESCRIPTION OF EMBODIMENTS

Hereinbelow, a dye-sensitized solar cell according to the present invention, a solar cell module using the dye-sensitized solar cells according to the present invention, and a method for producing the dye-sensitized solar cell according to the present invention will be described in detail.

A. Dye-Sensitized Solar Cell

The dye-sensitized solar cell according to the present invention comprises: a base material for dye-sensitized solar cell that functions as an electrode, has flexibility, and has a porous layer, containing a dye-sensitizer-supported fine particle of a metal oxide semiconductor, provided on one surface of the base material for dye-sensitized solar cell; a counter electrode base material that is arranged so as to oppose to the base material for dye-sensitized solar cell, functions as an electrode, and has flexibility; and a solid electrolyte layer that is provided between the base material for dye-sensitized solar cell and the counter electrode base material so as to come into contact with the porous layer, wherein at least one of the base material for dye-sensitized solar cell and the counter electrode base material has transparency; at least one of the base material for dye-sensitized solar cell and the counter electrode base material has an insulating layer provided on a surface thereof; the insulating layer is provided in a region which surrounds a porous layer-forming region where the porous layer is formed, and which is where the base material for dye-sensitized solar cell and the counter electrode base material are opposed to each other; and the insulating layer has an external communication portion that leads from an inside of the porous layer-forming region to outside.

In the present invention, the phrase "the insulating layer has an external communication portion that leads from an inside of the porous layer-forming region to outside" means that the insulating layer is provided in such a manner that the porous layer-forming region is not hermetically sealed, and refers to, for example, a state where there is a portion where the base material for dye-sensitized solar cell and the counter electrode base material are not opposed to each other and the insulating layer is not provided in a region surrounding the porous layer or a state where, when the insulating layer is provided so as to surround the entire porous layer, the insulating layer has a void space in at least part thereof.

Further, the phrase "the insulating layer has a void space" refers to a state where the insulating layer is provided so as not to come into contact with one of the base material for dye-sensitized solar cell and the counter electrode base material or a state where the insulating layer is partially absent.

Further, in the present invention, the term "solid electrolyte layer" refers to one having no fluidity.

Figure 1A:
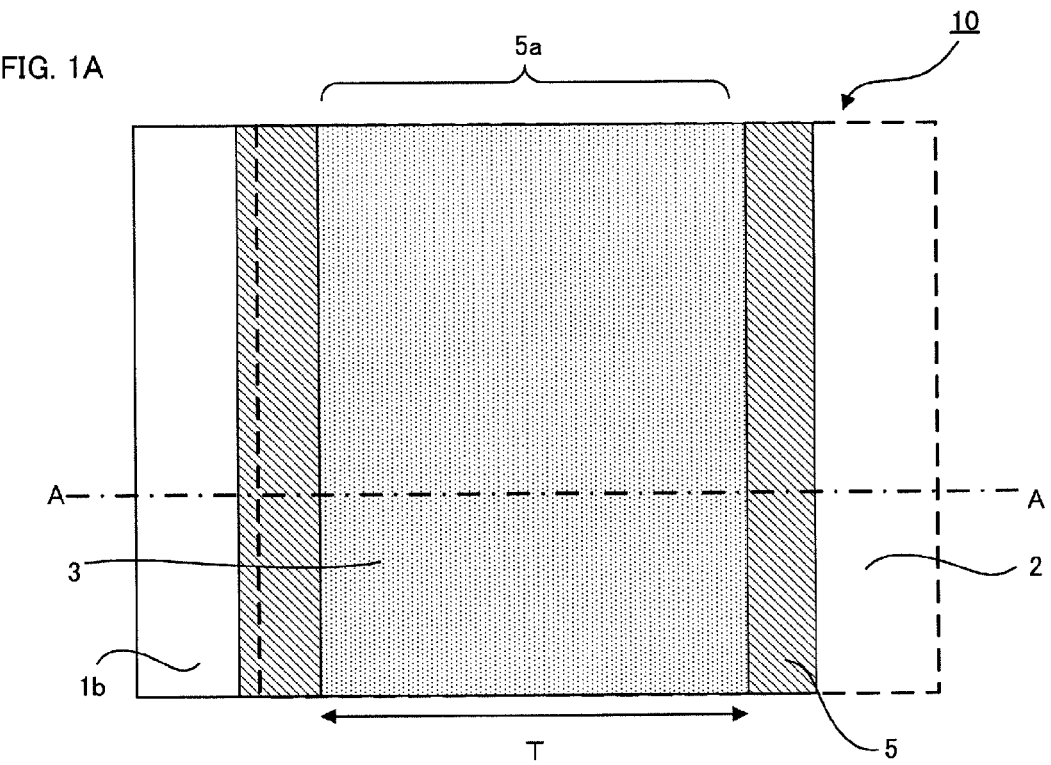
FIGS. 1A and 1B are each a schematic view of one example of a dye-sensitized solar cell according to the present invention.
Figure 1B:
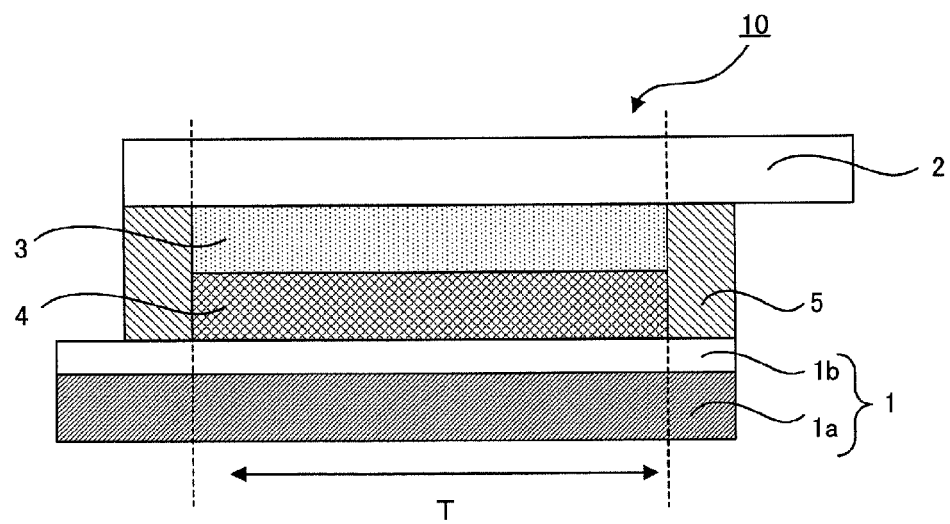

The dye-sensitized solar cell according to the present invention will be described with reference to the accompanying drawings. FIG. 1A is a schematic view of one example of the dye-sensitized solar cell according to the present invention, and FIG. 1B is a sectional view of the dye-sensitized solar cell according to the present invention taken along the A-A line in FIG. 1A. As shown in FIG. 1B, a dye-sensitized solar cell 10 according to the present invention comprises: a base material for dye-sensitized solar cell 1 that has a base material 1a, a first electrode layer 1b, and a porous layer 4 provided on the first electrode layer 1b and containing dye-sensitizer-supported fine particles of a metal oxide semiconductor; a counter electrode base material 2 that is arranged so as to oppose to the base material for dye-sensitized solar cell 1 and functions as an electrode; a solid electrolyte layer 3 provided between the base material for dye-sensitized solar cell 1 and the counter electrode base material 2 so as to come into contact with the porous layer 4; and an insulating layer 5 provided on the surface of the base material for dye-sensitized solar cell 1 and the surface of the counter electrode base material 2. It is to be noted that in FIG. 1B, the insulating layer 5 is provided on the surface of the base material for dye-sensitized solar cell 1 and the surface of the counter electrode base material 2, but may be provided on the surface of at least one of the base material for dye-sensitized solar cell 1 and the counter electrode base material 2. Further, as shown in FIG. 1A, the insulating layer 5 is provided in a region which surrounds a porous layer-forming region T where the porous layer 4 is formed, and which is where the base material for dye-sensitized solar cell 1 and the counter electrode base material 2 are opposed to each other. The dye-sensitized solar cell 10 according to the present invention has, in a region surrounding the porous layer 4, a portion where the base material for dye-sensitized solar cell 1 and the counter electrode base material 2 are not opposed to each other and the insulating layer 5 is not provided as an external communication portion 5a that leads from the porous layer-forming region T to the outside of the dye-sensitized solar cell 10. It is to be noted that in FIG. 1A, the base material 1a and the porous layer 4 are omitted for illustrative clarity.

Figure 2A:
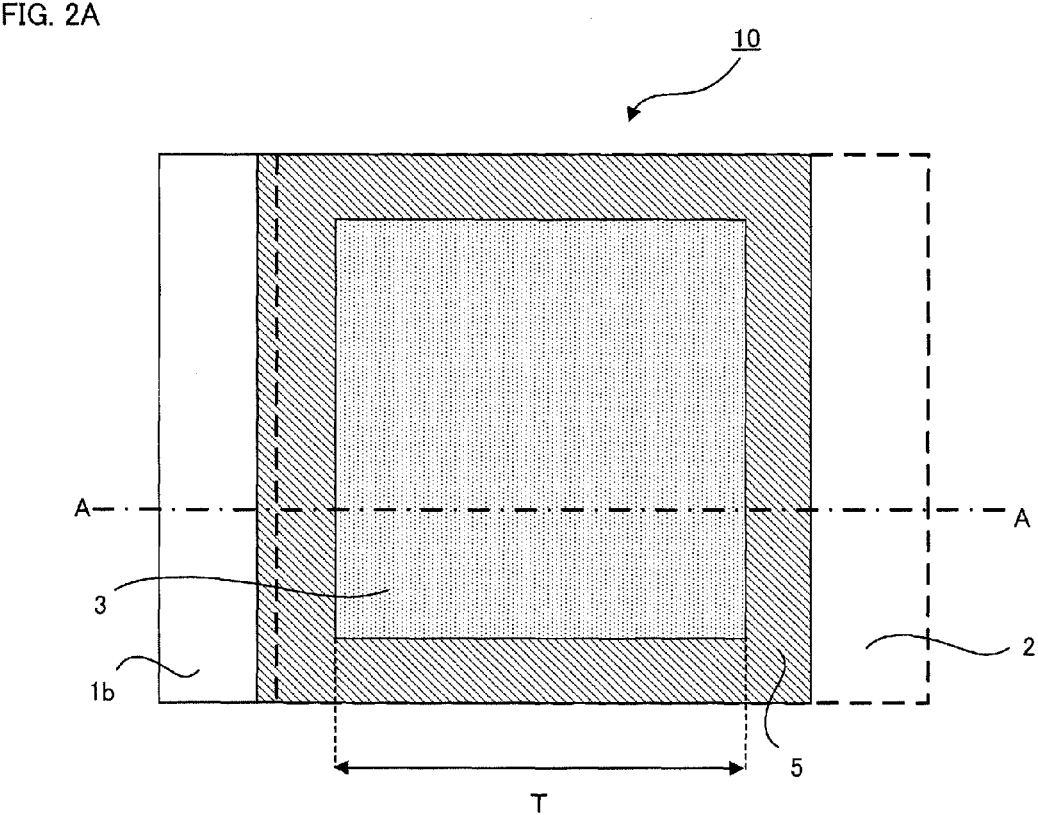
FIGS. 2A and 2B are each a schematic view of another example of the dye-sensitized solar cell according to the present invention.
Figure 2B:
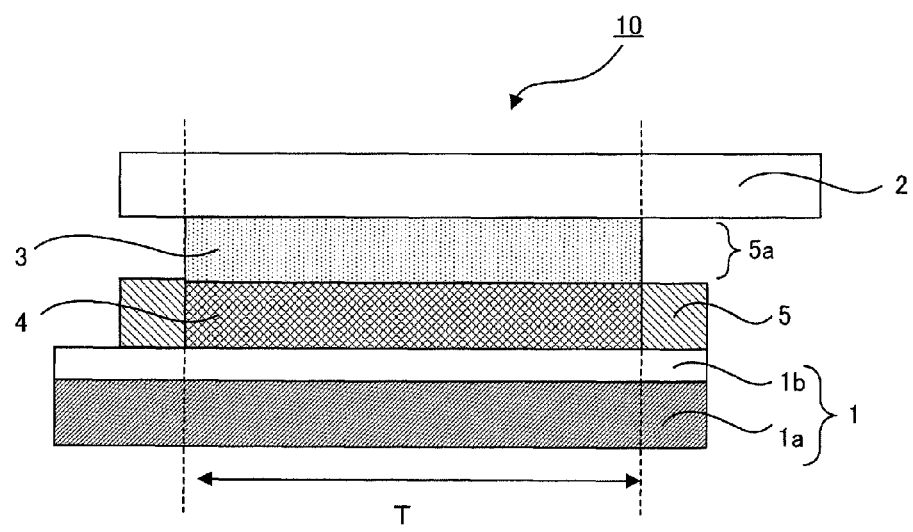

FIGS. 2A and 2B are each a schematic view of another example of the dye-sensitized solar cell according to the present invention. The dye-sensitized solar cell shown in each of FIGS. 2A and 2B is one in which the insulating layer 5 is provided so as to surround the porous layer-forming region T. FIG. 2B is a schematic sectional view of the dye-sensitized solar cell according to the present invention taken along the A-A line in FIG. 2A. As shown in FIG. 2A, when the insulating layer 5 is provided so as to surround the porous layer-forming region T, as shown in FIG. 2B, the external communicating portion 5a is provided in a region surrounding the porous layer 4 by providing a void space in the thickness direction of the insulating layer, that is, by providing the insulating layer 5 on the surface of only one of the base material for dye-sensitized solar cell 1 and the counter electrode base material 2. In FIG. 2B, the insulating layer 5 is provided not on the counter electrode base material 2 but on the base material for dye-sensitized solar cell 1, but may be provided not on the base material for dye-sensitized solar cell 1 but on the counter electrode base material 2. It is to be noted that reference signs shown in FIGS. 2A and 2B but not described here are the same as those shown in FIGS. 1A and 1B, and therefore a description thereof is omitted here.

According to the present invention, by providing the insulating layer, it is possible to prevent contact between the base material for dye-sensitized solar cell and the counter electrode base material in a region which surrounds the porous layer-forming region and which is where both the base materials are opposed to each other. This makes it possible to prevent the occurrence of a short circuit in the dye-sensitized solar cell.

Further, according to the present invention, by providing the solid electrolyte layer using an electrolyte having no fluidity, it is possible to eliminate the necessity to seal the solid electrolyte layer with an expensive sealant having high resistance to iodine. This allows the dye-sensitized solar cell to be produced at low cost. Further, as described above, since the solid electrolyte layer does not need to be sealed with a sealant, adjustment of the formation position of each of the members and alignment between the base material for dye-sensitized solar cell and the counter electrode base material for bonding during the production of the dye-sensitized solar cell do not require high accuracy. This allows the dye-sensitized solar cell to be easily produced.

Figure 12:
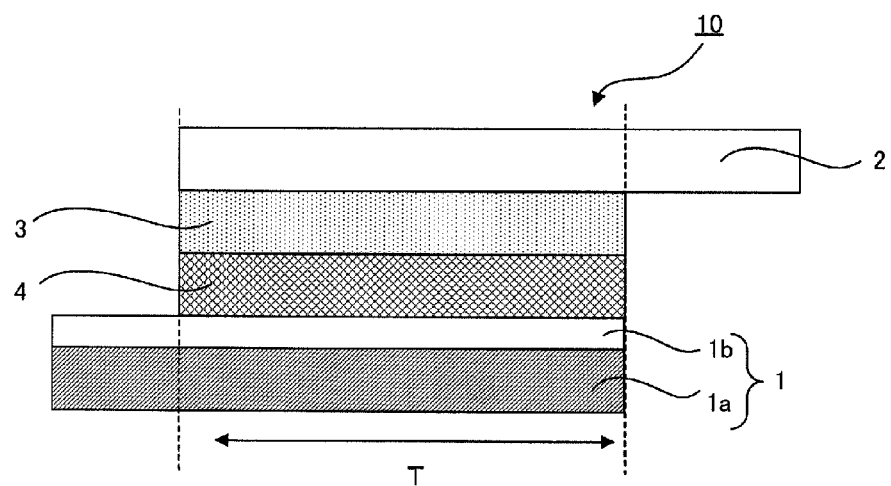
FIG. 12 is a schematic view of one example of a dye-sensitized solar cell.

In the case of a dye-sensitized solar cell using a solid electrolyte layer, it can be considered that, for example as shown in FIG. 12, the occurrence of a short circuit in the dye-sensitized solar cell can be prevented not by providing the insulating layer 5 but by not providing, around the porous layer-forming region T where the porous layer 4 is formed, a region where the base material for dye-sensitized solar cell 1 and the counter electrode base material 2 are opposed to each other. However, the production of such a dye-sensitized solar cell involves a possible problem that alignment between the base material for dye-sensitized solar cell and the counter electrode base material for bonding requires high accuracy, resulting in a complicated production process. It is to be noted that reference signs shown in FIG. 12 but not described here are the same as those shown in FIGS. 1A and 1B.

However, according to the present invention, since the insulating layer is provided, alignment between the base material for dye-sensitized solar cell and the counter electrode base material for bonding during the production of the dye-sensitized solar cell does not require high accuracy. This allows the dye-sensitized solar cell to be easily produced.

Further, according to the present invention, by providing the external communication portion in a region surrounding the porous layer, it is possible to discharge air in the dye-sensitized solar cell through the external communication portion when the base material for dye-sensitized solar cell and the counter electrode base material are bonded together in the step of bonding them together during the production of the dye-sensitized solar cell. This allows the dye-sensitized solar cell to be easily produced.

Further, since the dye-sensitized solar cell according to the present invention uses the solid electrolyte layer, a multifaceted member that allows the two or more dye-sensitized solar cells to be obtained can be previously prepared, and the plural dye-sensitized solar cells can be obtained by cutting the multifaceted member into predetermined sizes. This makes it possible to mass-produce the dye-sensitized solar cell at low cost by preparing such a multifaceted member by, for example, a Roll-to-Roll method and cutting it into predetermined sizes.

Figure 3:
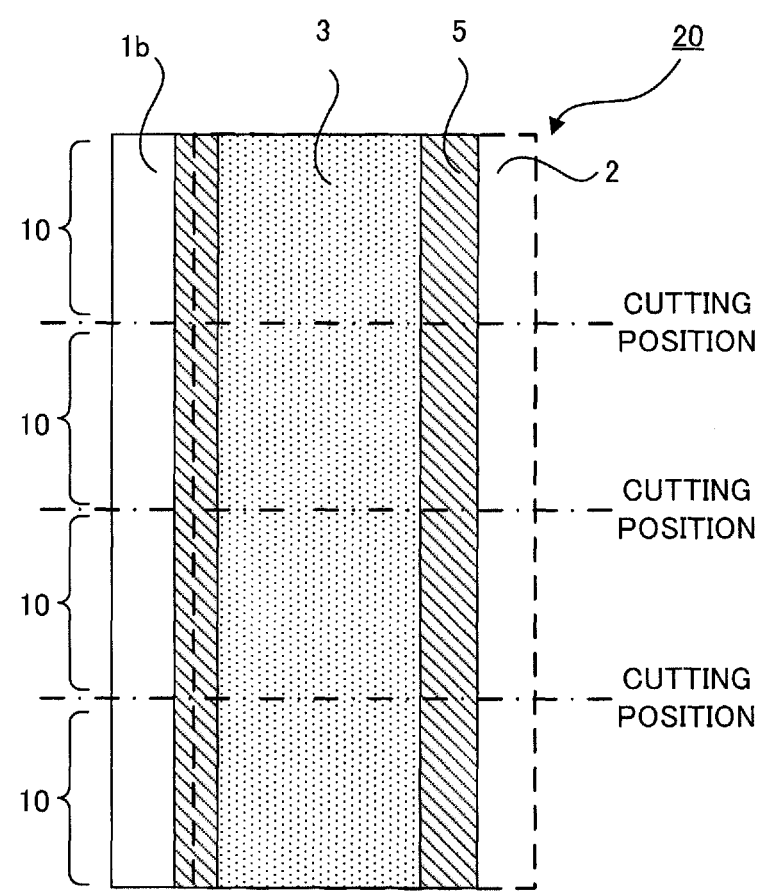
FIG. 3 is a schematic view of one example of a multifaceted member that allows the dye-sensitized solar cells according to the present invention to be obtained.
Figure 4:
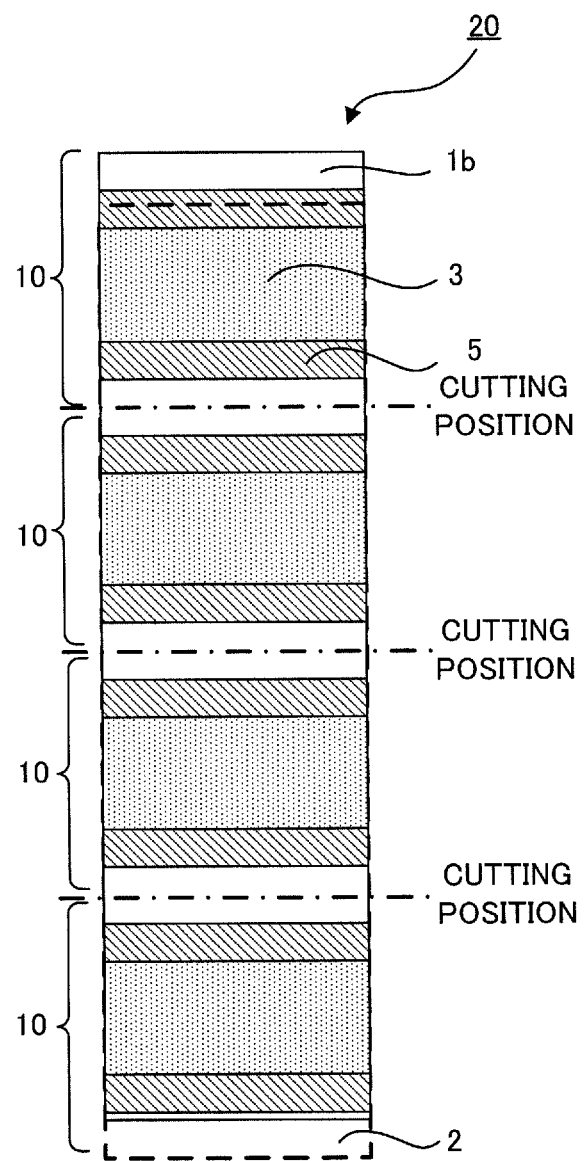
FIG. 4 is a schematic view of another example of the multifaceted member that allows the dye-sensitized solar cells according to the present invention to be obtained.
Figure 5:
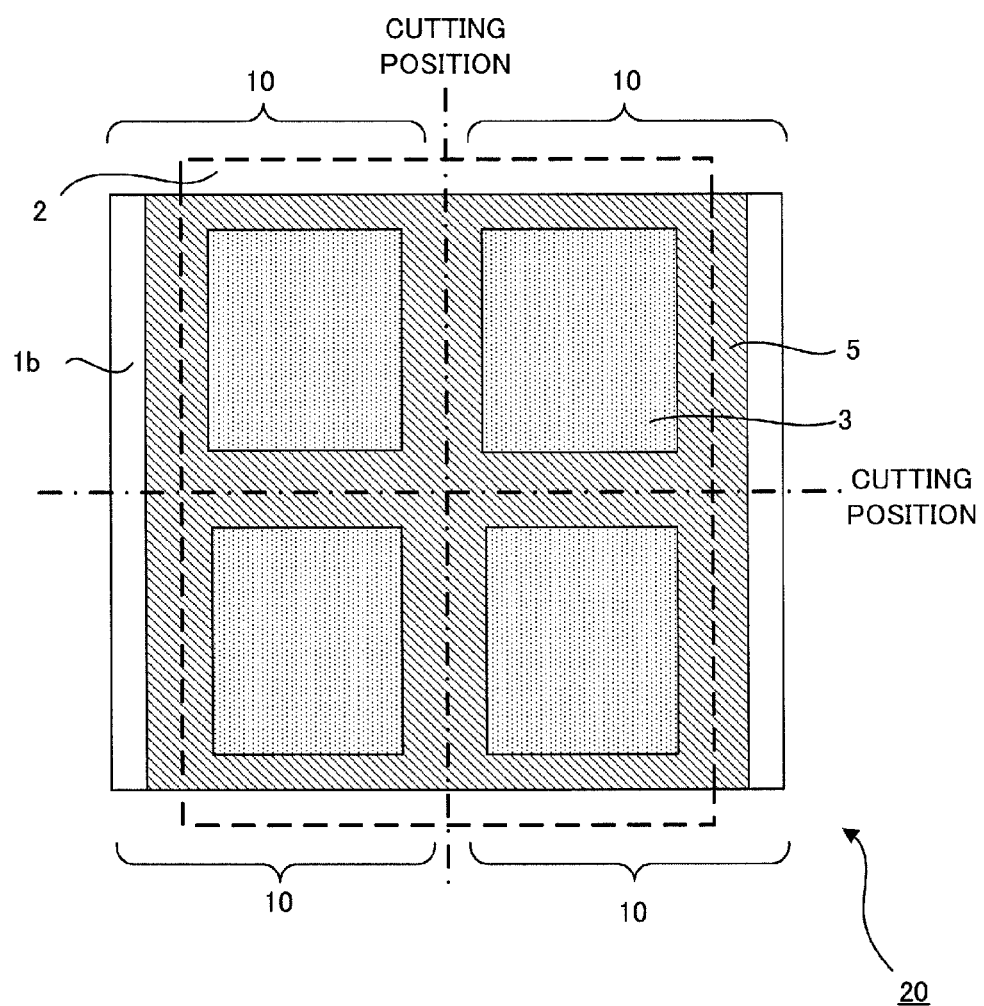
FIG. 5 is a schematic view of yet another example of the multifaceted member that allows the dye-sensitized solar cells according to the present invention to be obtained.

The multifaceted member prepared to mass-produce the dye-sensitized solar cell according to the present invention will be described with reference to the drawings. FIGS. 3 to 5 are schematic views of examples of the multifaceted member that allows the dye-sensitized solar cells according to the present invention to be obtained. As shown in FIGS. 3 to 5, a multifaceted member 20 used in the present invention includes plural dye-sensitized solar cells 10 produced in advance. The mass production of the dye-sensitized solar cell 10 can be achieved by cutting the multifaceted member 20 at cutting positions. It is to be noted that when the multifaceted member shown in FIG. 3 or 4 is used, such two or more dye-sensitized solar cells as shown in FIGS. 1A and 1B whose porous layer-forming region is rectangle and insulating layer is provided along the two opposite sides of the porous layer-forming region can be produced by cutting the multifaceted member at cutting positions.

On the other hand, when the multifaceted member shown in FIG. 5 is used, such two or more dye-sensitized solar cells as shown in FIGS. 2A and 2B whose insulating layer is provided so as to surround the porous layer-forming region can be produced by cutting the multifaceted member at cutting positions.

It is to be noted that reference signs shown in FIGS. 3 and 4 but not described here are the same as those shown in FIGS. 1A-1B and reference signs shown in FIG. 5 but not described here are the same as those shown in FIGS. 2A-2B, and therefore a description thereof is omitted here.

Hereinbelow, each of the members used in the present invention will be described.

1. Insulating Layer

The insulating layer used in the present invention is provided on the surface of at last one of the base material for dye-sensitized solar cell (which will be described later) and the counter electrode base material (which will be described later) in a region which surrounds the porous layer-forming region where the porous layer (which will be described later) is formed, and which is where the base material for dye-sensitized solar cell and the counter electrode base material are opposed to each other.

In the dye-sensitized solar cell according to the present invention, the insulating layer provided in a region surrounding the porous layer (which will be described later) has the external communication portion that leads from the porous layer-forming region to the outside of the dye-sensitized solar cell. As described above, the external communication portion refers to a portion which is provided in a region surrounding the porous layer and where the insulating layer is not provided and the base material for dye-sensitized solar cell and the counter electrode base material are not opposed to each other or a void space provided in the insulating layer provided so as to surround the porous layer.

The dye-sensitized solar cell according to the present invention is not particularly limited as long as the insulating layer is formed so as to have, as the external communication portion, at least one of the following two types of external communication portions: a portion which is provided in a region surrounding the porous layer and where the insulating layer is not provided and the base material for dye-sensitized solar cell and the counter electrode base material are not opposed to each other; and a void space provided in the insulating layer provided so as to surround the porous layer. The insulating layer may be formed so as to have both the types of external communication portions.

Therefore, the insulating layer used in the present invention is not particularly limited as long as it is formed such that the dye-sensitized solar cell according to the present invention can have the external communication portion in a region surrounding the porous layer and electrical contact between the base material for dye-sensitized solar cell and the counter electrode base material in a region surrounding the porous layer can be prevented.

When the external communication portion is of a type provided, in a region surrounding the porous layer, as a portion where the base material for dye-sensitized solar cell and the counter electrode base material are not opposed to each other and the insulating layer is not provided and the porous layer is, for example, polygonal, the insulating layer used in the present invention is not particularly limited as long as it is formed in such a manner that at least one of the sides of the polygonal porous layer-forming region serves as the external communication portion.

Further, according to the present invention, it is preferred that the porous layer-forming region is quadrilateral and the insulating layer is provided along the two opposite sides of the porous layer-forming region as shown in FIGS. 1A and 1B. By forming the insulating layer in such a manner as described above, the dye-sensitized solar cell can be easily produced and can achieve high quality even by mass production.

It is to be noted that when the external communication portion is of the type described above, the insulating layer may be formed so as to come into close contact with the base material for dye-sensitized solar cell and the counter electrode base material.

On the other hand, when the external communication portion is of a type provided as a void space in the insulating layer provided so as to surround the porous layer, the insulating layer is not particularly limited as long as it is formed so as to have at least one of: a void space where the insulating layer is not in contact with one of the base material for dye-sensitized solar cell and the counter electrode base material, and a void space where the insulating layer is not provided and which is provided in part of a region which surrounds the porous layer-forming region where the porous layer is formed, and which is where the base material for dye-sensitized solar cell and the counter electrode base material are opposed to each other. The insulating layer may have both the void spaces. It is to be noted that the void space where the insulating layer is not provided is preferably formed in such a manner that the base material for dye-sensitized solar cell (which will be described later) and the counter electrode base material (which will be described later) do not come into contact with each other.

Examples of the insulating layer having, as the external communication portion, a void space where the insulating layer is not in contact with one of the base material for dye-sensitized solar cell and the counter electrode base material include: one obtained by forming an insulating layer on only one of the base material for dye-sensitized solar cell and the counter electrode base material so as not to come into contact with the other base material, and one obtained by forming an insulating layer on both the surface of the base material for dye-sensitized solar cell and the surface of the counter electrode base material in such a manner that the insulating layers are not come into contact with each other.

On the other hand, when having, as the external communication portion, a void space where the insulating layer is not provided and which is provided in part of a region which surrounds the porous layer-forming region where the porous layer is formed, and which is where the base material for dye-sensitized solar cell and the counter electrode base material are opposed to each other, the insulating layer may be formed so as to come into close contact with both the base material for dye-sensitized solar cell and the counter electrode base material.

Figure 6:
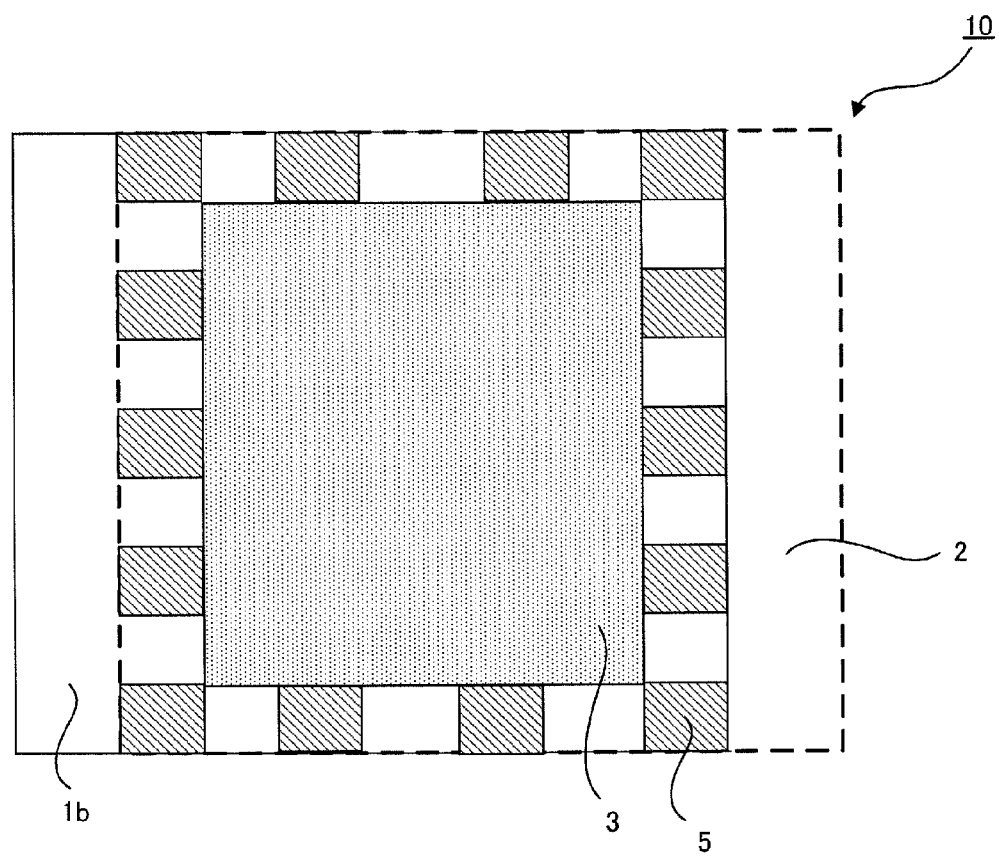
FIG. 6 is a schematic view of another example of the dye-sensitized solar cell according to the present invention.

It is to be noted that in the dye-sensitized solar cells shown in FIGS. 1 to 5, the insulating layer 5 is formed in a continuous stripe shape, but as shown in FIG. 6, the insulating layer 5 may be composed of islands spaced apart from one another in such a manner that the base material for dye-sensitized solar cell 1 and the counter electrode base material 2 do not come into contact with each other. It is to be noted that reference signs shown in FIG. 6 but not described here are the same as those shown in FIGS. 2A and 2B.

Figure 7A:
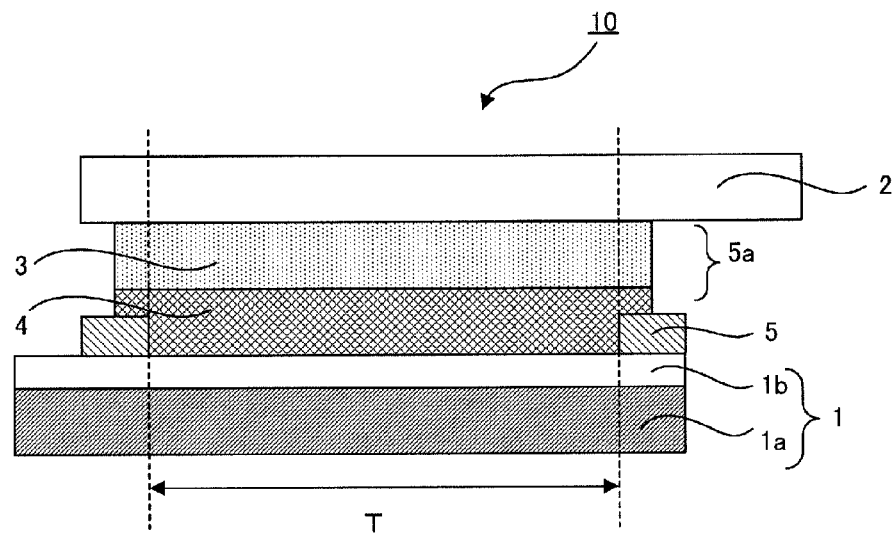
FIGS. 7A and 7B are each a schematic view of yet another example of the dye-sensitized solar cell according to the present invention.
Figure 7B:
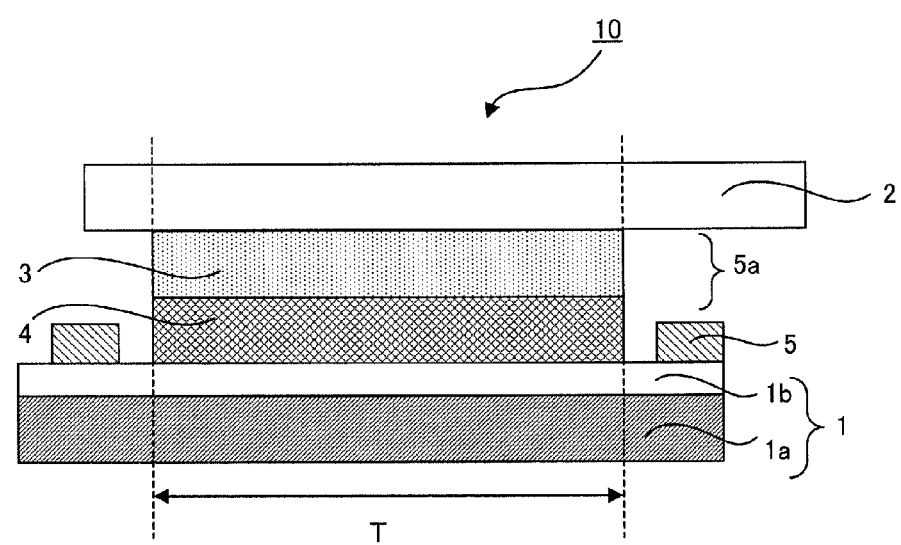

According to the present invention, the insulating layer is not particularly limited as long as it is formed so as to prevent electrical contact between the base material for dye-sensitized solar cell (which will be described later) and the counter electrode base material (which will be described later). For example, as shown in FIG. 7A, the porous layer 4 and the solid electrolyte layer 3 may be formed on part of the insulating layer 5, or as shown in FIG. 7B, a gap may be formed between the insulating layer 5 and a laminated body composed of the porous layer 4 and the solid electrolyte layer 3. Therefore, according to the present invention, adjustment of the formation position of each of the members of the dye-sensitized solar cell does not require high accuracy, which allows the dye-sensitized solar cell to be easily produced. It is to be noted that reference signs shown in FIGS. 7A and 7B but not described here are the same as those shown in FIGS. 2A and 2B.

The width of the insulating layer is not particularly limited as long as the insulating layer can prevent electrical contact between the base material for dye-sensitized solar cell and the counter electrode base material. When the width of the insulating layer is larger, the degree of accuracy required for alignment between the base material for dye-sensitized solar cell and the counter electrode base material for bonding is lower, that is, when the width of the insulating layer is smaller, the degree of accuracy required for such alignment for bonding is higher. Therefore, the width of the insulating layer is preferably determined in consideration of the power generating area of the dye-sensitized solar cell and the degree of accuracy required for alignment for bonding. More specifically, the width of the insulating layer is preferably in the range of 0.5 mm to 50 mm. If the width of the insulating layer is less than 0.5 mm, it is difficult to reliably prevent the occurrence of a short circuit in a region which surrounds the porous layer-forming region where the porous layer (which will be described later) is formed, and which is where the base material for dye-sensitized solar cell and the counter electrode base material are opposed to each other. On the other hand, if the width of the insulating layer exceeds 50 mm, the part of the dye-sensitized solar cell that does not contribute to power generation increases.

The material of the insulating layer used in the present invention is not particularly limited as long as it has insulating properties and can form the insulating layer on at least one of the base material for dye-sensitized solar cell and the counter electrode base material. The material of the insulating layer may be either one having transparency or one not having transparency.

Such a material of the insulating layer may be either inorganic or organic. Examples of the inorganic material include insulating materials such as $SiO_2$. Examples of the organic material include an elastomer such as natural rubber and nitrile rubber, an epoxy resin, an acrylic resin, a polyester resin, a urethane resin, an ionomer resin, and an ethylene-acrylic acid copolymer.

The film thickness of the insulating layer used in the present invention is not particularly limited as long as the insulating layer can prevent electrical contact between the base material for dye-sensitized solar cell and the counter electrode base material. The thickness of the insulating layer may be either larger or smaller than that of a laminated body composed of the porous layer (which will be described later) and the solid electrolyte layer (which will be described later).

More specifically, the difference in thickness between the insulating layer and a laminated body composed of the porous layer and the solid electrolyte layer is preferably about ±20 µm, more preferably about ±10 µm, and particularly preferably about ±5 µm.

When the difference in thickness between the insulating layer and a laminated body composed of the porous layer and the solid electrolyte layer is small, the dye-sensitized solar cell according to the present invention can have a uniform thickness at its ends.

According to the present invention, the insulating layer preferably has tackiness. When the insulating layer has tackiness, the base material for dye-sensitized solar cell and the counter electrode base material can be temporarily bonded together in advance to perform alignment between them or can be firmly bonded together using the insulating layer in the step of bonding together the base material for dye-sensitized solar cell and the counter electrode base material during the production of the dye-sensitized solar cell. It is to be noted that when the base material for dye-sensitized solar cell and the counter electrode base material are firmly bonded together, the insulating layer has a region where the insulating layer is in contact with only one of the base material for dye-sensitized solar cell and the counter electrode base material and is not in contact with the other or a region where the insulating layer is partially absent.

Further, in a case where the base material for dye-sensitized solar cell and the counter electrode base material are temporarily or firmly bonded together using the insulating layer having tackiness, even when the thickness of the insulating layer is smaller or larger than that of a laminated body composed of the porous layer and the solid electrolyte layer, the base material for dye-sensitized solar cell and the counter electrode base material can be temporarily or firmly bonded together by pressure bonding. Therefore, also in a case where the insulating layer has tackiness, the film thickness of the insulating layer may be either larger or smaller than that of a laminated body composed of the porous layer (which will be described later) and the solid electrolyte layer (which will be described later).

The tackiness of the insulating layer is not particularly limited as long as the base material for dye-sensitized solar cell and the counter electrode base material opposed to each other can be temporarily bonded together by the insulating layer having tackiness by pressure bonding. More specifically, the tackiness of the insulating layer is particularly preferably 100 mN/25 mm or larger. It is to be noted that the tackiness of the insulating layer can be determined by measuring a force required to peel off each of the base materials (peel force) with the use of a measuring instrument such as TENSILON™ manufactured by A&D Co., Ltd.

Examples of the material of such an insulating layer include some of the above-mentioned materials of the insulating layer that are solvent-based or polymerizable and have adhesiveness. Specific examples of such a material include various adhesives such as UV-curable adhesives, emulsion-type adhesives, heat-melt adhesives, dry lamination adhesives, and heat-sealable adhesives. Examples of the materials of such, adhesives include various materials such as natural rubber-based materials, nitrile rubber-based materials, epoxy resin-based materials, vinyl acetate emulsion-based materials, acrylic materials, acrylic acid ester copolymer-based materials, polyvinyl alcohol-based materials, phenol resin-based materials, urethane resins, and ionomer resins.

2. Solid Electrolyte Layer

The solid electrolyte layer used in the present invention is provided between the base material for dye-sensitized solar cell (which will be described later) and the counter electrode base material (which will be described later) so as to come into contact with the porous layer. Further, the solid electrolyte layer is located between the porous layer (which will be described later) and the counter electrode base material to transport electrical charge when electrical charge transferred from the porous layer is imported into the porous layer through the base material for dye-sensitized solar cell and the counter electrode base material.

As described above, the solid electrolyte layer used in the present invention has no fluidity during the production and use of the dye-sensitized solar cell according to the present invention. Examples of such a solid electrolyte layer include one obtained by solidifying a redox couple electrolyte by a polymer component and one obtained by lowering the fluidity of an electrolyte solution used in a general solar cell by adding titanium oxide particles or silica particles thereto. However, the solid electrolyte layer used in the present invention is preferably one obtained by solidifying a redox couple electrolyte by a polymer component. This is because such a solid electrolyte layer can be easily formed and is less likely to be degraded with time.

Preferred examples of the polymer component used for forming the solid electrolyte layer include polymers having, as a main chain, polyether, polymethacrylic acid, polyacrylic alkyl ester, polymethacrylic alkyl ester, polycaprolactone, polyhexamethylene carbonate, polysiloxane, polyethylene oxide, polypropylene oxide, polyacryinitrile, polyvinylidene fluoride, polyvinyl fluoride, polyhexafluoropropylene, polyfluoroethylene, polyethylene, polypropylene, or polyacrylonitrile and copolymers of two or more of these monomer components.

Alternatively, the polymer component used for forming the solid electrolyte layer may be a cellulose-based resin. A cellulose-based resin has high heat resistance, and therefore an electrolyte layer solidified by a cellulose-based resin does not cause liquid leakage even at high temperature and has high heat stability. Specific examples of such a cellulose-based resin include: cellulose; cellulose acetates (CA) such as cellulose acetate, cellulose diacetate, and cellulose triacetate; cellulose esters such as cellulose acetate butylate (CAB), cellulose acetate propionate (CAP), cellulose acetate phthalate, and cellulose nitrate; and cellulose ethers such as methyl cellulose, ethyl cellulose, benzyl cellulose, cyanoethyl cellulose, hydroxymethyl cellulose, hydroxyethyl cellulose, hydroxypropyl cellulose, hydroxypropylmethyl cellulose, and carboxymethyl cellulose. These cellulose-based resins may be used singly or in combination of two or more of them. Among these cellulose-based resins, cationic cellulose derivatives are particularly preferably used from the viewpoint of compatibility with an electrolyte solution. The cationic cellulose derivative refers to one obtained by cationizing cellulose or its derivative by reacting OH groups thereof with a cationization agent. By allowing an electrolyte solution to contain such a cationic cellulose derivative, it is possible to obtain a solid electrolyte that is excellent in the ability to hold the electrolyte solution, does not cause leakage of the electrolyte solution even at high temperature or even by application of pressure, and has excellent heat stability.

The molecular weight of such a cellulose-based resin varies depending on the type of cellulose-based resin used and is not particularly limited. However, the weight-average molecular weight of the cellulose-based resin is preferably 10,000 or more (polystyrene standard), and particularly preferably in the range of 100,000 to 200,000 from the viewpoint of achieving excellent film forming properties for forming the electrolyte layer. For example, when ethyl cellulose is used as the cellulose-based resin, the ethyl cellulose preferably has a molecular weight such that a 2 wt % aqueous solution thereof has a viscosity of 10 mPa·s to 1000 mPa·s, and particularly 5 mPa·s to 500 mPa·s at 30° C.

The glass transition temperature of the cellulose-based resin is preferably in the range of 80 to 150° C. to allow the electrolyte layer to have sufficiency heat stability.

The polymer component content of the solid electrolyte layer is not particularly limited as long as the solid electrolyte layer can be formed. However, if the concentration of the polymer component in the solid electrolyte layer is too low, the heat stability of the solid electrolyte layer is reduced. On the other hand, if the concentration of the polymer component in the solid electrolyte layer is too high, the photoelectric conversion efficiency of the solar cell is reduced. Therefore, the concentration of the polymer component in the solid electrolyte layer is appropriately determined in consideration of such factors. More specifically, the concentration of the polymer component in the solid electrolyte layer is preferably 5 wt % to 60 wt %. If the concentration of the polymer component in the solid electrolyte layer is lower than the above lower limit, there is a case where adequate adhesion between the solid electrolyte layer and the porous layer (which will be described later) cannot be achieved, and there is also a case where the mechanical strength of the solid electrolyte layer itself is reduced. On the other hand, if the concentration of the polymer component in the solid electrolyte layer exceeds the above upper limit, there is a fear that the function of transporting electrical charge is inhibited because the polymer component having insulating properties is present in a large amount.

The redox couple electrolyte contained in the solid electrolyte layer used in the present invention is not particularly limited as long as it is generally used in solid electrolyte layers. More specifically, a combination of iodine and iodide and a combination of bromine and bromide are preferred. Examples of the combination of iodine and iodide include combinations of $I_2$ and a metal iodide such as LiI, NaI, KI, or $CaI_2$. Examples of the combination of bromine and bromide include combinations of $Br_2$ and a metal bromide such as LiBr, NaBr, KBr, or $CaBr_2$.

The redox couple electrolyte content of the solid electrolyte layer is not particularly limited as long as the solid electrolyte layer can be formed. More specifically, the redox couple electrolyte content of the solid electrolyte layer is preferably in the range of 1 wt % to 50 wt %, and particularly preferably in the range of 5 wt % to 35 wt %. By setting the redox couple electrolyte content to a value within the above range, it is possible for the solid electrolyte layer to sufficiently perform the function of transporting electrical charge from a second electrode layer to an oxide semiconductor layer.

If necessary, the solid electrolyte layer used in the present invention may appropriately contain a component other than the polymer component and the redox couple electrolyte. An example of such a component is an ionic liquid.

The ionic liquid is used to reduce the viscosity of the electrolyte and to improve ionic conductivity to thereby enhance photoelectric conversion efficiency. The ionic liquid has a very low vapor pressure, and virtually hardly evaporates at room temperature. Therefore, unlike conventional organic solvents, the ionic liquid is free from the risk of volatilization or ignition, thereby preventing the deterioration of cell characteristics caused by volatilization. Examples of the ionic liquid include: ionic liquids containing cations (positive ions) such as imidazolium-based cations (e.g., 1-methyl-3-methylimidazolium, 1-ethyl-3-methylimidazolium, 1-propyl-3-methylimidazolium, 1-butyl-3-methylimidazolium, 1-hexyl-3-methylimidazolium, 1-octyl-3-methylimidazolium, 1-octadecyl-3-methylimidazolium, 1-methyl-2,3-dimethylimidazolium, 1-butyl-2,3-dimethylimidazolium, 1-hexyl-2,3-dimethylimidazolium, 1-octyl-2,3-dimethylimidazolium, and 1-octadecyl-2,3-dimethylimidazolium), pyridium-based cations (e.g., 1-methyl-pyridium, 1-butyl-pyridium, and 1-hexyl-pyridium), alicyclic amine-based cations, aliphatic amine-based cations; and ionic liquid containing anions (negative ions) such as an iodine ion, a bromine ion, a chlorine ion, fluorine-based anions (e.g., tetrafluoroborate, hexafluoroborate, trifluoromethane sulfonate, and trifluoroacetate), cyanate-based anions, and thiocyanate-based anions. These materials may be used singly or in combination of two or more of them.

When an iodide-based ionic liquid containing iodine as an anion is used, it functions not only as a source of iodine ions and but also as the redox couple described above. Specific examples of such an iodide-based ionic liquid include 1,2-dimethyl-3-n-propylimidazolium iodide, 1-methyl-3-n-propylimidazolium iodide, 1-propyl-3-methylimidazolium iodide, 1-butyl-2,3-dimethylimidazolium iodide, and 1-hexyl-3-methylimidazolium iodide. It is to be noted that when the electrolyte layer contains an ionic liquid that also functions as a redox couple such as an iodide-based ionic liquid, such an ionic liquid is regarded not as an ionic liquid but as a redox couple to determine the concentration of a redox couple and the concentration of an ionic liquid in the electrolyte layer.

The ionic liquid content of the solid electrolyte layer used in the present invention varies depending on the type of ionic liquid used. However, as the ratio between redox couple/ionic liquid/resin of the solid electrolyte layer, the resin content of the solid electrolyte layer is preferably 5 wt % to 60 wt % and particularly preferably 5 wt % to 40 wt %, the ionic liquid content of the solid electrolyte layer is preferably 0 wt % to 80 wt % and particularly preferably 10 wt % to 70 wt %, and the redox couple (including PMIm-I) content of the solid electrolyte layer is preferably 3 wt % to 95 wt % and particularly preferably 10 wt % to 85 wt %.

The film thickness of the solid electrolyte layer is not particularly limited as long as it is commonly used for solid electrolyte layers, but is preferably in the range of 0.5 µm to 100 µM and particularly preferably in the range of 2 µm to 50 µm.

3. Porous Layer

Hereinbelow, the porous layer used in the present invention will be described. The porous layer used in the present invention contains dye-sensitizer-supported fine particles of a metal oxide semiconductor provided on the base material for dye-sensitized solar cell (which will be described later), and is in contact with the solid electrolyte layer.

The shape of the porous layer used in the present invention is not particularly limited as long as the porous layer can be formed on the base material for dye-sensitized solar cell (which will be described later), and examples thereof include polygons. Among polygons, the shape of the porous layer used in the present invention is preferably a quadrilateral. This makes it easy to form the porous layer. Further, when the shape of the porous layer is a quadrilateral, the insulating layer can also be easily formed in a region surrounding the porous layer.

Here, the phrase "the shape of the porous layer is a quadrilateral" means that the porous layer is a rectangle, a parallelogram, a rhombus, or the like. It is to be noted that the term "quadrilateral" also includes rectangles, parallelograms, rhombuses, and the like whose corners only are rounded.

The porous layer-forming region, in which the porous layer used in the present invention is formed, is not particularly limited as long as it is located on the base material for dye-sensitized solar cell (which will be described later) and is not hermetically sealed with the insulating layer. For example, as shown in FIGS. 2A and 2B, the porous layer may be formed so that the insulating layer can be formed all around the porous layer. Alternatively, as shown in FIGS. 1A and 1B, the porous layer may be formed so that there is a portion where the base material for dye-sensitized solar cell and the counter electrode base material are not opposed to each other and the insulating layer is not provided in a region surrounding the porous layer.

The positional relationship between the porous layer and the above-mentioned insulating layer used in the present invention is not particularly limited as long as the porous layer-forming region is not hermetically sealed with the insulating layer and the insulating layer can prevent the occurrence of an internal short circuit in a region surrounding the porous layer. For example, as shown in FIG. 2B, the porous layer may be provided inside the insulating layer, or as shown in FIG. 7A, the porous layer may be provided on part of the surface of the insulating layer.

The metal oxide semiconductor fine particles and the dye sensitizer used for forming the porous layer will be described below.

(1) Metal Oxide Semiconductor Fine Particles

The metal oxide semiconductor fine particles used in the present invention are not particularly limited as long as they are made of a metal oxide having semiconductor characteristics. Examples of such a metal oxide constituting the metal oxide semiconductor fine particles used in the present invention include $TiO_2$, $ZnO$, $SnO_2$, ITO, $ZrO_2$, $MgO$, $Al_2O_3$, $CeO_2$, $Bi_2O_3$, $Mn_3O_4$, $Y_2O_3$, $WO_3$, $Ta_2O_5$, $Nb_2O_5$, and $La_2O_3$. The metal oxide semiconductor fine particles made of such a metal oxide are suitable for forming the porous layer, and are therefore preferably used in the present invention to improve energy conversion efficiency and achieve cost reduction.

The metal oxide semiconductor fine particles used in the present invention may be made of the same metal oxide or two or more different metal oxides. The metal oxide semiconductor fine particles used in the present invention may have a core-shell structure in which a core fine particle made of one metal oxide semiconductor is coated with a shell made of another metal oxide semiconductor.

Among others, metal oxide semiconductor fine particles made of $TIO_2$ are most preferably used in the present invention. This is because $TIO_2$ is particularly excellent in semiconductor characteristics.

The average particle size of the metal oxide semiconductor fine particles used in the present invention are not particularly limited as long as the porous layer can have a specific surface area within a desired range, but is usually preferably in the range of 1 nm to 10 μl and particularly preferably in the range of 10 nm to 1000 nm. If the average particle size is less than the above lower limit, there is a case where the individual metal oxide semiconductor fine particles agglomerate to form secondary particles. On the other hand, if the average particle size exceeds the above upper limit, there is a possibility that not only an increase in the thickness of the porous layer but also a reduction in the porosity, that is, specific surface area, of the porous layer occurs. If the specific surface area of the porous layer is reduced, for example, there is a case where it is difficult for the porous layer to support a dye sensitizer in an amount sufficient to achieve photoelectric conversion.

It is to be noted that the average particle size of the metal oxide semiconductor fine particles refers to an average primary particle size.

The metal oxide semiconductor fine particles used in the present invention may be metal oxide semiconductor fine particles having the same average particle size or two or more types of metal oxide semiconductor fine particles having different average particle sizes. The use of a combination of two or more types of metal oxide semiconductor fine particles having different average particle sizes has the advantage that light scattering effect in the porous layer can be enhanced and therefore the dye-sensitized solar cell according to the present invention has higher power generation efficiency.

When two or more types of metal oxide semiconductor fine particles having different average particle sizes are used in the present invention, an example of a combination of different particle sizes is a combination of metal oxide semiconductor fine particles having an average particle size of 10 nm to 50 nm and metal oxide semiconductor fine particles having an average particle size of 50 nm to 800 nm.

(2) Dye Sensitizer

The dye sensitizer used in the present invention is not particularly limited as long as it can absorb light to generate electromotive force. Examples of such a dye sensitizer include organic pigments and metal complex pigments. Examples of the organic pigments include acridine-based pigments, azo-based pigments, indigo-based pigments, quinone-based pigments, coumarine-based pigments, merocyanine-based pigments, phenylxanthene, indoline, and carbazole-based pigments. Among these organic pigments, coumarine-based pigments are preferably used in the present invention. On the other hand, as the metal complex pigments, ruthenium-based pigments are preferably used. Among them, ruthenium bipyridine pigments and ruthenium terpyridine pigments, which are ruthenium complexes, are particularly preferably used. This is because such ruthenium complexes have wide light absorption wavelength ranges and therefore the wavelength range of light that can be converted into electricity can be significantly broadened.

(3) Optional Component

The porous layer used in the present invention may contain an optional component other than the metal oxide semiconductor fine particles. Examples of such an optional component used in the present invention include binder resins. By allowing the porous layer to contain a binder resin, it is possible to improve the brittleness of the porous layer used in the present invention.

The binder resin that can be used for the porous layer in the present invention is not particularly limited as long as the brittleness of the porous layer can be improved to a desired level. However, according to the present invention, since the porous layer is provided so as to come into contact with the electrolyte layer, the binder resin to be used for the porous layer needs to have resistance to the electrolyte layer. Examples of such a binder resin include polyvinyl pyrrolidone, ethyl cellulose, and caprolactam.

It is to be noted that the binder resins that can be used in the present invention may be used singly or in combination of two or more of them.

(4) Others

The thickness of the porous layer used in the present invention is not particularly limited, and can be appropriately determined depending on the intended use of the dye-sensitized solar cell according to the present invention. However, the thickness of the porous layer used in the present invention is usually preferably in the range of 1 μm to 100 μm and particularly preferably in the range of 3 μm to 30 μm. If the thickness of the porous layer exceeds the above upper limit, there is a case where cohesive failure of the porous layer itself is likely to occur, which is likely to result in membrane resistance. On the other hand, if the thickness of the porous layer is less than the above lower limit, there is a possibility that it is difficult to form the porous layer so as to have a uniform thickness or the porous layer cannot sufficiently absorb sunlight due to a reduction in the amount of the supporting dye sensitizer and therefore performance failure occurs.

The porous layer used in the present invention may have a structure composed of a single layer or a structure in which two or more layers are laminated. As such a structure of the porous layer in which two or more layers are laminated, any structure can be appropriately selected and used depending on, for example, a method for forming the base material for dye-sensitized solar cell used in the present invention. For example, the porous layer may have a two-layer structure composed of an oxide semiconductor layer that is in contact with the base material for dye-sensitized solar cell and an intermediate layer that is provided on the oxide semiconductor layer and has a porosity higher than that of the oxide semiconductor layer. This is because by allowing the porous layer to have such a two-layer structure composed of an oxide semiconductor layer and an intermediate layer, it is possible to easily form the porous layer used in the present invention by a so-called transfer method. More specifically, the porous layer used in the present invention can be formed by a method in which the porous layer and the first electrode layer are formed on a heat-resistant substrate by burning and are then transferred onto the base material for dye-sensitized solar cell. Therefore, by allowing the porous layer used in the present invention to have such a two-layer structure composed of an oxide semiconductor layer and an intermediate layer, it is possible to reduce the adhesive force between the heat-resistant substrate and the porous layer without degrading the performance of the porous layer, which makes it easy to form the base material for dye-sensitized solar cell used in the present invention by a transfer method.

In a case where the porous layer has a two-layer structure composed of the oxide semiconductor layer and the intermediate layer, the ratio of the thickness of the oxide semiconductor layer to the thickness of the intermediate layer is not particularly limited, but is preferably in the range of 10:0.1 to 10:5, and more preferably in the range of 10:0.1 to 10:3.

The porosity of the oxide semiconductor layer is preferably in the range of 10 to 60%, and particularly preferably in the range of 20 to 50%. If the porosity of the oxide semiconductor layer is less than the above lower limit, for example, there is a possibility that the porous layer cannot effectively absorb sunlight. On the other hand, if the porosity of the oxide semiconductor layer exceeds the above upper limit, there is a possibility that the porous layer cannot contain a desired amount of dye sensitizer for support.

The porosity of the intermediate layer is not particularly limited as long as it is larger than that of the oxide semiconductor layer, but is usually preferably in the range of 25 to 65%, and particularly preferably in the range of 30 to 60%.

It is to be noted that in the present invention, the porosity refers to the percentage of volume not occupied by the metal oxide semiconductor fine particles per unit volume. The porosity can be determined by measuring a pore volume by a gas sorption analyzer (Autosorb-1 MP™ manufactured by Quantachrome Instruments) and then calculating the ratio of the pore volume to a volume per unit area. The porosity of the intermediate layer can be determined by measuring the porosity of the porous layer, in which the oxide semiconductor layer and the intermediate layer are laminated, and then performing calculation using a value obtained by measurement of only the oxide semiconductor layer.

4. Base Material for Dye-Sensitized Solar Cell

The base material for dye-sensitized solar cell used in the present invention functions as an electrode, has flexibility, and has a porous layer, containing dye-sensitizer-supported fine particles of a metal oxide semiconductor, provided on one surface of the base material for dye-sensitized solar cell.

Here, the flexibility of the base material for dye-sensitized solar cell refers to the ability to bend when a force of 5 KN is applied to the base material for dye-sensitized solar cell in accordance with a bending test method for fine ceramics specified in JIS R1601 or a bending test method for metal materials specified in JIS Z 2248.

The base material for dye-sensitized solar cell has two embodiments, one having a base material and a first electrode layer provided on the base material (hereinafter, referred to as a "first embodiment") and the other being composed of a metal foil (hereinafter, referred to as a "second embodiment"). Each of the embodiments will be described below. It is to be noted that when the first embodiment of the base material for dye-sensitized solar cell is used, the porous layer is provided on the first electrode layer.

(1) First Embodiment

The first embodiment of the base material for dye-sensitized solar cell includes a base material and a first electrode layer provided on the base material. The base material and the first electrode layer will be described below.

(a) Base Material

First, the base material used in this embodiment will be described. The base material used in this embodiment is not particularly limited as long as it has flexibility and has self-supporting properties so as to be able to support the first electrode layer used in this embodiment and the porous layer.

It is to be noted that the definition of the flexibility of the base material is the same as that described above with reference to the base material for dye-sensitized solar cell, and therefore a description thereof is omitted here.

The base material is not particularly limited as long as it has flexibility, and specific examples thereof include a thin glass base material and a resin base material. Among them, a resin base material is preferred because it is light, has excellent workability, and contributes to lower production costs.

The base material used in this embodiment is not particularly limited as long as a first electrode layer can be formed thereon. Further, the base material used in this embodiment may be either one having transparency or one not having transparency, but is preferably one having transparency. This is because it is possible to form a transparent base material for dye-sensitized solar cell composed of a base material having transparency and a first electrode layer having sunlight transmission.

Examples of the resin base material include base materials made of resin such as an ethylene-tetrafluoroethylene copolymer film, a biaxially-drawn polyethylene terephthalate film, a polyether sulfone (PES) film, a polyether ether ketone (PEEK) film, a polyether imide (PEI) film, a polyimide (PI) film, a polyester naphthalate (PEN) film, and a polycarbonate (PC) film. Among them, a biaxially-drawn polyethylene terephthalate (PET) film, a polyester naphthalate (PEN) film, and a polycarbonate (PC) film are preferably used in this embodiment.

The thickness of the base material used in this embodiment can be appropriately selected depending on, for example, the intended use of the dye-sensitized solar cell, but is usually preferably in the range of 10 µm to 2000 µm, particularly preferably in the range of 50 µm to 1800 µm, and more preferably in the range of 100 µm to 1500 µm.

The base material used in this embodiment preferably has excellent heat resistance, weather resistance, and gas barrier properties against water vapor and other gases. By allowing the base material to have gas barrier properties, for example, it is possible to improve the temporal stability of the dye-sensitized solar cell according to the present invention. Particularly, the base material used in this embodiment preferably has gas barrier properties such that oxygen permeability is 1 cc/m$^2$/day·atm or less under conditions of a temperature of 23° C. and a humidity of 90% and water vapor permeability is 1 g/m$^2$/day or less under conditions of a temperature of 37.8° C. and a humidity of 100%. According to this embodiment, any gas barrier layer may be provided on the base material to achieve such gas barrier properties.

(b) First Electrode Layer

The first electrode layer used in this embodiment will be described below. The first electrode layer used in this embodiment is provided on the base material.

The material of the first electrode layer used in this embodiment is not particularly limited as long as it has desired conductivity, and a conductive polymer material, a metal oxide, or the like can be used.

The metal oxide is not particularly limited as long as it has desired conductivity, but the metal oxide used in this embodiment preferably has sunlight transmission. Examples of such a metal oxide having sunlight transmission include $SnO_2$, ITO, IZO, and ZnO. According to this embodiment, any of these metal oxides can be preferably used, but fluorine-doped $SnO_2$ (hereinafter, referred to as "FTO") or ITO is particularly preferably used. This is because FTO and ITO are excellent in both conductivity and sunlight transmission.

On the other hand, examples of the conductive polymer material include polythiophene, polyethylenesulfonic acid (PSS), polyaniline (PA), polypyrrole, and polyestyrene dioxythiophene (PEDOT). These conductive polymer materials may be used in combination of two or more of them.

The first electrode layer used in this embodiment may have a structure composed of a single layer or a structure in which two or more layers are laminated. Examples of such a structure in which two or more layers are laminated include one in which two or more layers made of materials different in work function from each other are laminated and one in which two or more layers made of metal oxides different from each other are laminated.

The thickness of the first electrode layer used in this embodiment is not particularly limited as long as the first electrode layer can have desired conductivity that depends on, for example, the intended use of the dye-sensitized solar cell. However, the thickness of the first electrode layer used in this embodiment is usually preferably in the range of 5 nm to 2000 nm, and particularly preferably in the range of 10 nm to 1000 nm. If the thickness of the first electrode layer exceeds the above upper limit, there is a case where it is difficult to make the first electrode layer uniform or it is difficult to achieve high photoelectric conversion efficiency due to a reduction in total light transmittance. On the other hand, if the thickness of the first electrode layer is less than the above lower limit, there is a possibility that the first electrode layer is poor in conductivity.

It is to be noted that, when the first electrode layer is composed of two or more layers, the thickness refers to the total thickness of all the layers.

A method for forming the first electrode layer on the base material is the same as a general method for forming an electrode layer, and therefore a description thereof is omitted here.

(c) Optional Component

The base material for dye-sensitized solar cell according to this embodiment comprises at least the base material and the first electrode layer, but if necessary, may include another optional component. An example of such an optional component used in this embodiment is an auxiliary electrode made of a conductive material and provided so as to come into contact with the first electrode layer. By providing such an auxiliary electrode, it is possible, when the first electrode layer is poor in conductivity, to compensate for the lack of conductivity. This is advantageous in that the dye-sensitized solar cell according to the present invention can have higher power generation efficiency.

(2) Second Embodiment

The second embodiment of the base material for dye-sensitized solar cell is composed of a metal foil.

In the case of the base material for dye-sensitized solar cell according to this embodiment, the metal foil itself functions as an electrode. Therefore, the base material for dye-sensitized solar cell according to this embodiment does not always need to have another component. The metal foil used as the base material for dye-sensitized solar cell is not particularly limited as long as it has flexibility. Examples of the material of the metal foil include copper, aluminum, titanium, chromium, tungsten, molybdenum, platinum, tantalum, niobium, zirconium, zinc, various stainless steels, and alloys of two or more of them. Among them, titanium, chromium, tungsten, various stainless steels, and alloys of two or more of them are preferred. When the base material for dye-sensitized solar cell composed of a metal foil is used, the thickness of the metal foil is not particularly limited as long as the metal foil has flexibility and can impart self-supporting properties to the base material for dye-sensitized solar cell so that the porous layer can be formed on the base material for dye-sensitized solar cell. However, the thickness of the metal foil is usually preferably in the range of 5 μm to 1000 μm, more preferably in the range of 10 μm to 500 μm, and even more preferably in the range of 20 μm to 200 μm.

5. Counter Electrode Base Material

Hereinbelow, the counter electrode base material used in the present invention will be described. The counter electrode base material used in the present invention is arranged so as to oppose to the base material for dye-sensitized solar cell, functions as an electrode, and has flexibility.

The definition of the flexibility of the counter electrode base material used in the present invention is the same as that described above with reference to the base material for dye-sensitized solar cell, and therefore a description thereof is omitted here.

The counter electrode base material used in the present invention is not particularly limited as long as it functions as an electrode. Examples of such a counter electrode base material include one composed of a metal foil and one having a structure in which a second electrode layer is provided on a counter base material.

When the counter electrode base material used in the present invention is composed of a metal foil, it is the same as that described above in the section "(2) Second Embodiment" in the paragraph "4. Base Material for Dye-Sensitized Solar Cell", and therefore a description thereof is omitted here.

On the other hand, when the counter electrode base material used has a structure in which a second electrode layer is provided on a counter base material, the second electrode layer is not particularly limited as long as it is made of a conductive material having desired conductivity, and may be made of a conductive polymer material, a metal oxide, or the like. Examples of the conductive polymer material and the metal oxide include those mentioned above as materials for forming the first electrode layer.

The second electrode layer used in the present invention may have a structure composed of a single layer or a structure in which two or more layers are laminated. Examples of such a structure in which two or more layers are laminated include one in which two or more layers made of materials different in work function from each other are laminated and one in which two or more layers made of metal oxides different from each other are laminated. The thickness of the second electrode layer used in the present invention is usually preferably in the range of 5 nm to 2000 nm, and particularly preferably in the range of 10 nm to 1000 nm.

The counter base material used in the present invention is the same as the base material used in the base material for dye-sensitized solar cell, and therefore a description thereof is omitted here.

If necessary, the counter electrode base material used in the present invention may have a catalyst layer. By providing a catalyst layer in the counter electrode base material, it is possible to further enhance the power generation efficiency of the dye-sensitized solar cell according to the present invention. Examples of such a catalyst layer include, but are not limited to, one formed on the second electrode layer by vapor deposition of Pt and one made of polyethylene dioxythiophene (PEDOT), polystyrenesulfonic acid (PSS), polyaniline (PA), paratoluenesulfonic acid (PTS), or a mixture of two or more of them. It is to be noted that when the counter electrode base material used has the counter base material and the second electrode layer, the catalyst layer is provided on the second electrode layer.

6. Combination of Base Material for Dye-Sensitized Solar Cell and Counter Electrode Base Material The dye-sensitized solar cell according to the present invention acts when the dye sensitizer adsorbed to the porous layer receives sunlight and is excited. Therefore, at least one of the base material for dye-sensitized solar cell and the counter electrode base material needs to have transparency. For this reason, according to the present invention, the base material for dye-sensitized solar cell and the counter electrode base material are appropriately selected so that at least one of them has transparency. According to the present invention, both the base material for dye-sensitized solar cell and the counter electrode base material may have transparency or one of the base material for dye-sensitized solar cell and the counter electrode base material may be composed of a metal foil while the other has transparency.

According to the present invention, it is more preferred that the base material for dye-sensitized solar cell is composed of a metal foil and the counter electrode base material has transparency. This is because when the base material for dye-sensitized solar cell is composed of a metal foil, the porous layer can be directly formed on the base material for dye-sensitized solar cell by burning, which makes it possible to achieve good adhesion between the base material for dye-sensitized solar cell and the porous layer.

Further, when the dye-sensitized solar cell has such an inverted structure, light enters the porous layer through the solid electrolyte layer, and therefore there is a concern about the loss of light in the solid electrolyte layer. Therefore, the thickness of the solid electrolyte layer is preferably reduced, but a reduction in the thickness of the solid electrolyte layer narrows the gap between the two base materials, which increases the risk of a short circuit between the electrodes. For this reason, in the case of such an inverted-structure dye-sensitized solar cell, the use of the insulating layer used in the present invention is preferred because the insulating layer effectively performs its function and has a great effect.

Further, according to the present invention, it is also preferred that the base material for dye-sensitized solar cell has transparency and the counter electrode base material is composed of a metal foil. When the dye-sensitized solar cell has such a structure, the occurrence of a short circuit in the dye-sensitized solar cell can be more effectively prevented by providing the insulating layer described above.

7. Other Members

The dye-sensitized solar cell according to the present invention is not particularly limited as long as it comprises the above-described insulating layer, solid electrolyte layer, porous layer, base material for dye-sensitized solar cell, and counter electrode base material, and if necessary, another member may be provided. An example of such a member is a fixing member that is provided outside the base material for dye-sensitized solar cell and the counter electrode base material to fix these base materials when the base material for dye-sensitized solar cell and the counter electrode base material opposed to each other are bonded together.

Such a fixing member is not particularly limited as long as it can fix the base material for dye-sensitized solar cell and the counter electrode base material to prevent, for example, misalignment between them bonded together, and a fixing member usually used to bond base materials together can be used. Examples of the material of such a fixing member include low-density polyethylene (LDPE), straight (linear) low-density polyethylene (a polymer obtained by polymerization using a multi-site catalyst, LLDPE), an ethylene/α-olefin copolymer obtained by polymerization using a metallocene catalyst (single-site catalyst), middle-density polyethylene (MDPE), high-density polyethylene (HDPE), a polypropylene-based resin, an ethylene-vinyl acetate copolymer, an ionomer resin, an ethylene-acrylic acid copolymer, a thermoplastic polyester-based resin, a thermoplastic polyamide-based resin, and other thermoplastic resin. These materials may be used singly or in combination of two or more of them.

B. Dye-Sensitized Solar Cell Module

A dye-sensitized solar cell module according to the present invention comprises the two or more dye-sensitized solar cells described above in the paragraph "A. Dye-Sensitized Solar Cell" connected together.

The dye-sensitized solar cell module according to the present invention will be described with reference to FIG. 8.

Figure 8:
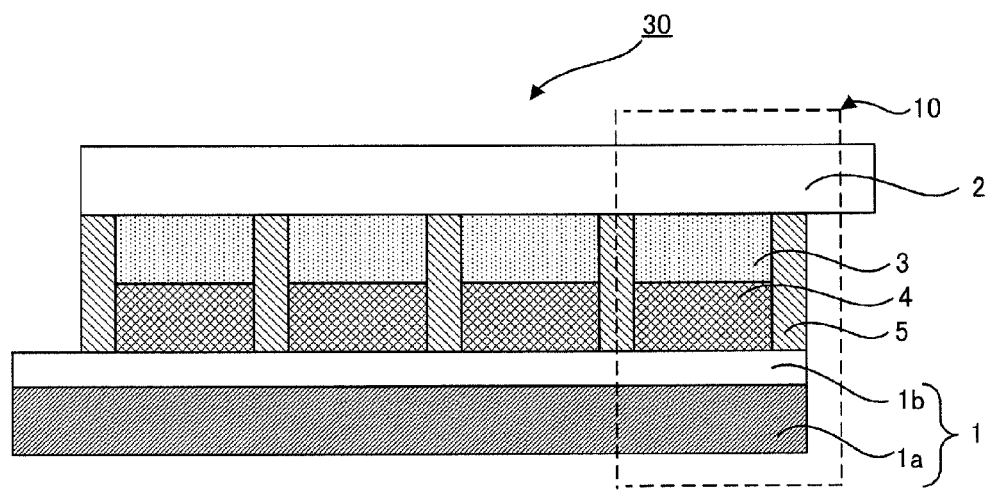
FIG. 8 is a schematic sectional view of one example of a dye-sensitized solar cell module according to the present invention.

FIG. 8 is a schematic sectional view of one example of the dye-sensitized solar cell module according to the present invention. A dye-sensitized solar cell module 30 according to the present invention comprises the two or more dye-sensitized solar cells 10 connected together in parallel, the dye-sensitized solar cells 10 each comprises: the base material for dye-sensitized solar cell 1 having: the base material 1a, the first electrode layer 1b, and the porous layer 4 provided on the first electrode layer 1b and containing dye-sensitizer-supported fine particles of a metal oxide semiconductor; the counter electrode base material 2 that is arranged so as to oppose to the base material for dye-sensitized solar cell 1 and functions as an electrode; the solid electrolyte layer 3 provided between the base material for dye-sensitized solar cell 1 and the counter electrode base material 2 so as to come into contact with the porous layer 4; and the insulating layer 5 provided on the surface of the base material for dye-sensitized solar cell 1 and the surface of the counter electrode base material 2.

It is to be noted that, although not shown, the dye-sensitized solar cells constituting the dye-sensitized solar cell module according to the present invention may be connected together in series.

According to the present invention, by connecting together the two or more dye-sensitized solar cells described above, it is possible to provide a dye-sensitized solar cell module in which the occurrence of an internal short circuit is suppressed.

The dye-sensitized solar cells used in the dye-sensitized solar cell module according to the present invention may be the same as that described above in the paragraph "A. Dye-Sensitized Solar Cell", and therefore a description thereof is omitted here.

The dye-sensitized solar cell module according to the present invention in which the two or more dye-sensitized solar cells are connected together is not particularly limited as long as it can generate a desired electromotive force, and the individual dye-sensitized solar cells may be connected together either in series or in parallel.

C. Method for Producing Dye-Sensitized Solar Cell

A method for producing a dye-sensitized solar cell according to the present invention comprises the steps of: first preparing a base material for dye-sensitized solar cell that functions as an electrode, has flexibility, and has a porous layer, containing dye-sensitizer-supported fine particles of a metal oxide semiconductor, provided on one surface of the base material for dye-sensitized solar cell, and a counter electrode base material that is arranged so as to oppose to the base material for dye-sensitized solar cell, functions as an electrode, and has flexibility; then forming the porous layer on the base material for dye-sensitized solar cell; forming a solid electrolyte layer so as to come into contact with the porous layer; forming an insulating layer on a surface of at least one of the base material for dye-sensitized solar cell and the counter electrode base material in a region which surrounds a region corresponding to a porous layer-forming region where the porous layer is formed, and which is where the base material for dye-sensitized solar cell and the counter electrode base material are opposed to each other when they are bonded together; and then bonding together the base material for dye-sensitized solar cell and the counter electrode base material opposed to each other with the porous layer and the solid electrolyte layer being interposed therebetween, wherein at least one of the base material for dye-sensitized solar cell and the counter electrode base material has transparency; and the porous layer-forming step, the solid electrolyte layer-forming step, and the insulating layer-forming step are performed in no particular order.

In the method for producing a dye-sensitized solar cell according to the present invention, the porous layer-forming step, the solid electrolyte layer-forming step, and the insulating layer-forming step can be performed in no particular order. This makes it possible to determine the order of these steps depending on the form of a dye-sensitized solar cell to be produced. The method for producing a dye-sensitized solar cell according to the present invention will be described below with reference to drawings.

Figure 9A:
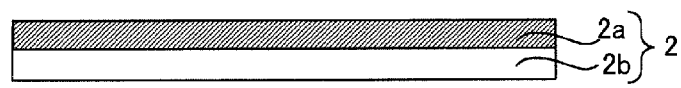
FIGS. 9A to 9E is a flow chart of one example of a method for producing a dye-sensitized solar cell according to the present invention.
Figure 9B:
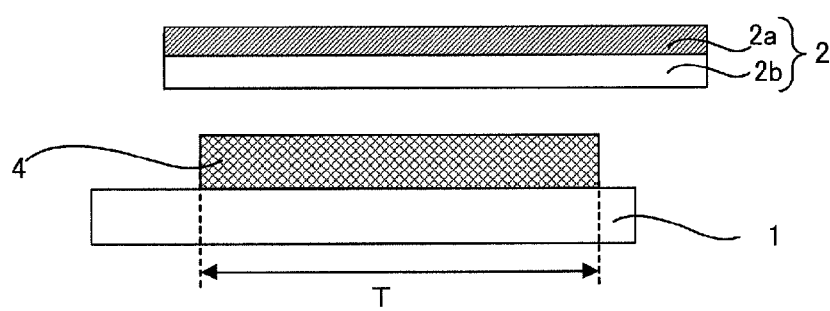
Figure 9C:
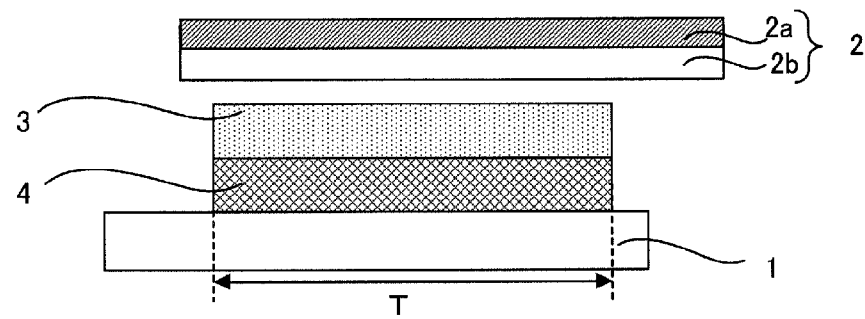
Figure 9D:
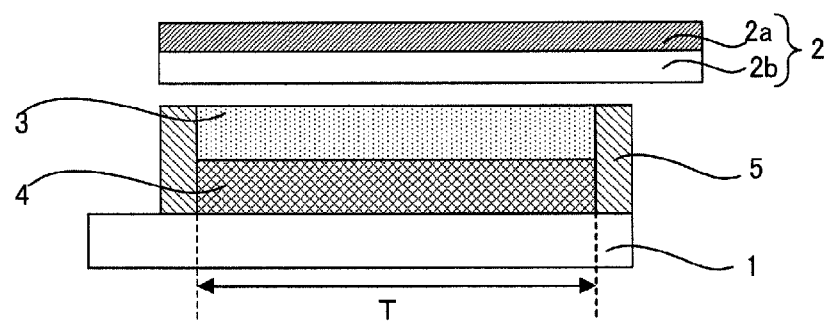
Figure 9E:
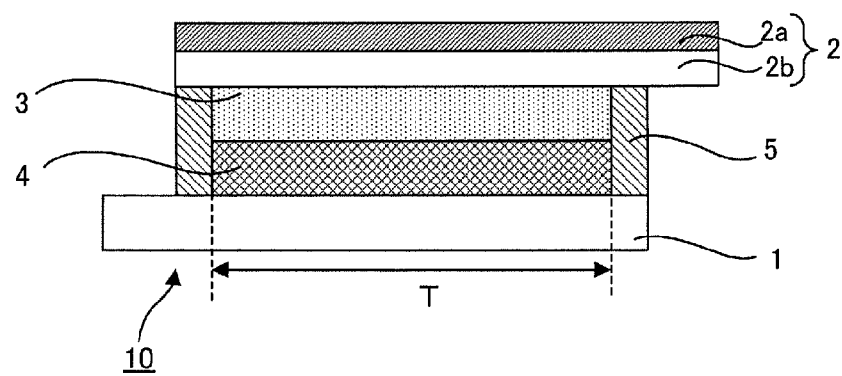

FIGS. 9A to 9E is a flow chart of one example of the method for producing a dye-sensitized solar cell according to the present invention. As shown in FIGS. 9A to 9E, the method for producing a dye-sensitized solar cell according to the present invention comprises the steps of: first preparing the base material for dye-sensitized solar cell 1 composed of a metal foil and the counter electrode base material 2 that is arranged so as to oppose to the base material for dye-sensitized solar cell 1 and has a counter base material 2a and a second electrode layer 2b (FIG. 9A); then forming, on the base material for dye-sensitized solar cell 1, the porous layer 4 containing dye-sensitizer-supported fine particles of a metal oxide semiconductor (FIG. 9B); forming the solid electrolyte layer 3 on the porous layer 4 (FIG. 9C); forming the insulating layer 5 on the base material for dye-sensitized solar cell 1 in a region which surrounds the porous layer-forming region T where the porous layer 4 is formed, and which is where the base material for dye-sensitized solar cell 1 and the counter electrode base material 2 are opposed to each other when they are bonded together (FIG. 9D); and then bonding together the base material for dye-sensitized solar cell 1 and the counter electrode base material 2 so that the second electrode layer 2b of the counter electrode base material 2 and the base material for dye-sensitized solar cell 1 are opposed to each other with the porous layer 4 and the solid electrolyte layer 3 being interposed therebetween (FIG. 9E).

Figure 10A:
FIGS. 10A to 10D is a flow chart of another example of the method for producing a dye-sensitized solar cell according to the present invention.
Figure 10B:
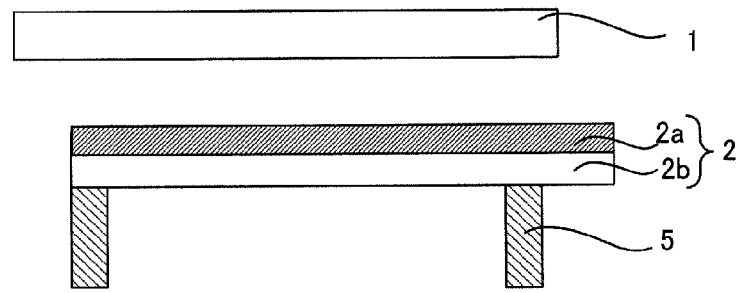
Figure 10C:
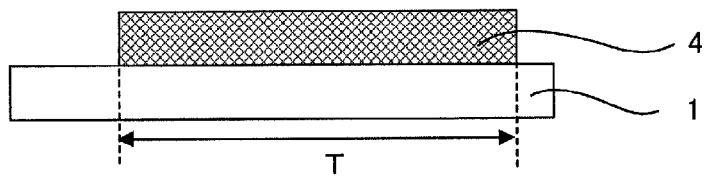
Figure 10D:
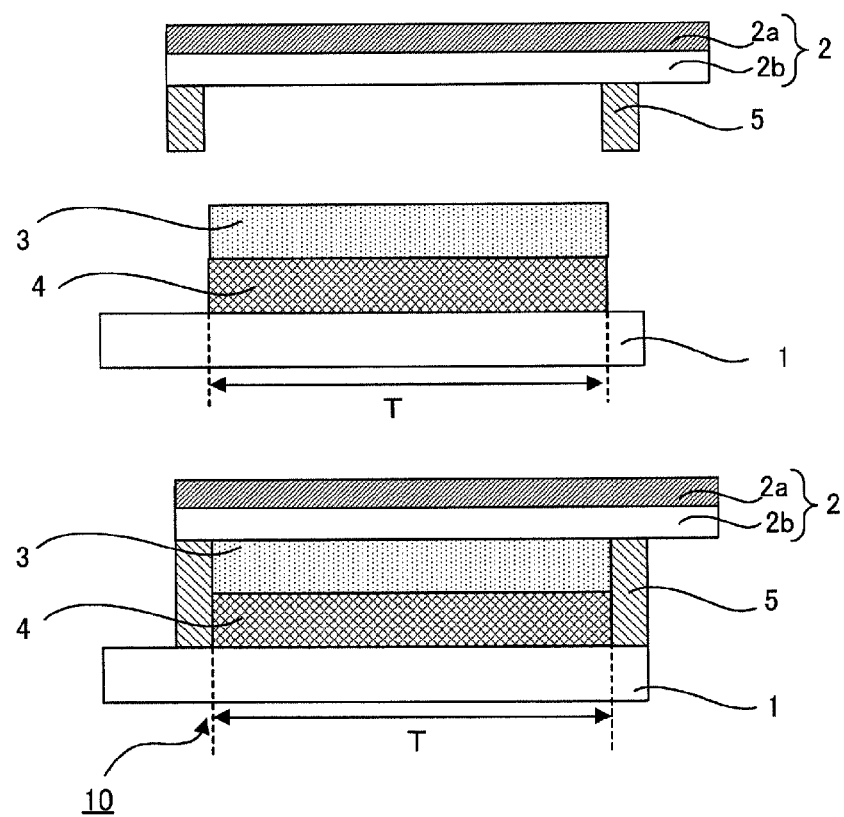
Figure 11:
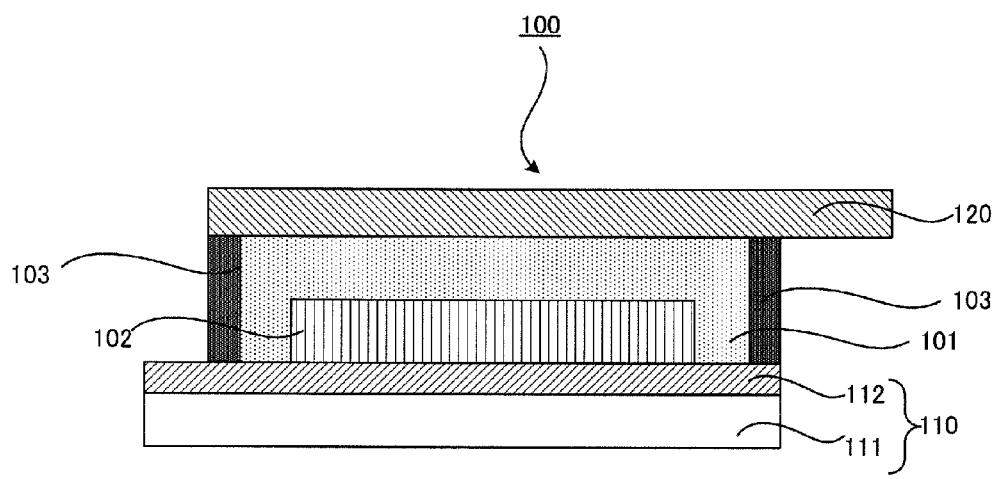
FIG. 11 is a schematic view of one example of a general dye-sensitized solar cell.

FIGS. 10A to 10D is a flow chart of another example of the method for producing a dye-sensitized solar cell according to the present invention. As shown in FIGS. 10A to 10D, the method for producing a dye-sensitized solar cell according to the present invention comprises the steps of: first preparing the base material for dye-sensitized solar cell 1 composed of a metal foil and the counter electrode base material 2 that is arranged so as to oppose to the base material for dye-sensitized solar cell 1 and has a counter base material 2a and a second electrode layer 2b (FIG. 10A); then forming the insulating layer 5 on the second electrode layer 2b of the counter electrode base material 2 in a region which surrounds a region corresponding to the porous layer-forming region T where the porous layer 4 is formed, and which is where the base material for dye-sensitized solar cell 1 and the counter electrode base material 2 are opposed to each other when they are bonded together (FIG. 10B); forming, on the base material for dye-sensitized solar cell 1, the porous layer 4 containing dye-sensitizer-supported fine particles of a metal oxide semiconductor (FIG. 10B); forming the solid electrolyte layer 3 on the porous layer 4 (FIG. 10C); and then bonding together the base material for dye-sensitized solar cell 1 and the counter electrode base material 2 so that the second electrode layer 2b of the counter electrode base material 2 and the base material for dye-sensitized solar cell 1 are opposed to each other with the porous layer 4 and the solid electrolyte layer 3 being interposed therebetween (FIG. 10D).

Although not shown, according to the present invention, the insulating layer may be formed on the base material for dye-sensitized solar cell before the porous layer-forming step and the solid electrolyte layer-forming step. FIGS. 9 and 10 illustrate cases where a metal foil is used as the base material for dye-sensitized solar cell, but the base material for dye-sensitized solar cell used may be one having a base material and a first electrode layer provided on the base material. When the base material for dye-sensitized solar cell has transparency, the counter electrode base material used may be one composed of a metal foil or one having a counter base material and a second electrode layer.

According to the present invention, it is possible to easily produce a dye-sensitized solar cell that does not cause an internal short circuit. Further, according to the present invention, since a solid electrolyte layer and an insulating layer are formed in the solid electrolyte layer-forming step and the insulating layer-forming step, alignment between the base material for dye-sensitized solar cell and the counter electrode base material for bonding in the bonding step does not require high accuracy, which makes it easy to produce a dye-sensitized solar cell.

Further, the method for producing a dye-sensitized solar cell according to the present invention does not include the step of sealing an electrolyte layer with a sealant, which makes it easier to produce a dye-sensitized solar cell as compared to a conventional method for producing a dye-sensitized solar cell in which a base material for dye-sensitized solar cell having a porous layer provided thereon and a counter electrode base material are sealed with a sealant and then an electrolyte layer is formed by injecting an electrolyte.

The base material for dye-sensitized solar cell and the counter electrode base material used in the method according to the present invention and a combination of the base material for dye-sensitized solar cell and the counter electrode base material are the same as those described above in the paragraph "A. Dye-Sensitized Solar Cell", and therefore a description thereof is omitted here.

The porous layer-forming step, the solid electrolyte layer-forming step, the insulating layer-forming step, and the bonding step of the method according to the present invention will be described below.

1. Porous Layer-Forming Step

This step is a step of forming a porous layer on the base material for dye-sensitized solar cell.

A method for forming a porous layer used in this step is not particularly limited as long as a desired porous layer can be formed on the base material for dye-sensitized solar cell. Specific examples of such a method include the following three methods: a method in which a porous layer is formed on a metal foil used as the base material for dye-sensitized solar cell by burning (hereinafter, referred to as a "third embodiment"); a method in which a porous layer is formed by applying a composition for forming a porous layer in a pattern onto the base material for dye-sensitized solar cell (hereinafter, referred to as a "fourth embodiment"); and a method in which a porous layer is formed on a heat-resistant substrate, placed on the base material for dye-sensitized solar cell, and then the heat-resistant substrate is removed (transfer method) (hereinafter, referred to as a "fifth embodiment"). Each of the embodiments will be described below.

(1) Third Embodiment

This embodiment of the porous layer forming method is a method in which a porous layer is formed on a metal foil used as the base material for dye-sensitized solar cell by burning.

The metal foil used in this embodiment is not particularly limited as long as it has heat resistance to withstand a burning temperature during formation of a porous layer by burning.

In this embodiment, since a metal foil is used as the base material for dye-sensitized solar cell, a transparent base material is prepared as the counter electrode base material.

As described above in the paragraph "A. Dye-Sensitized Solar Cell", when the dye-sensitized solar cell has an inverted structure, there is a concern about the loss of light in the solid electrolyte layer because light enters the porous layer through the solid electrolyte layer. Therefore, the thickness of the solid electrolyte layer is preferably reduced, but a reduction in the thickness of the solid electrolyte layer narrows the gap between the two base materials, which increases the risk of a short circuit between the electrodes. For this reason, when the dye-sensitized solar cell has an inverted structure, the insulating layer formed in the insulating layer-forming step (which will be described later) effectively performs its function and has a great effect. Therefore, the method of this embodiment in which a porous layer is formed on a metal foil used as the base material for dye-sensitized solar cell is preferred.

Further, a metal foil has a high upper temperature limit, and therefore the method of this embodiment has advantages such as a wider choice of materials used for forming a porous layer and good adhesion between the metal foil and the porous layer.

In the porous layer forming method of this embodiment, a coating liquid for forming a porous layer composed of metal oxide semiconductor fine particles, a binder resin, and a solvent is first prepared. Then, the prepared coating liquid for forming a porous layer is applied onto a metal foil to a desired film thickness to form a coating film for forming a porous layer, and then the coating film for forming a porous layer is burned to decompose the binder resin to form a layer for forming a porous layer. Then, a dye sensitizer is adhered to the surface of the layer for forming a porous layer to form a porous layer.

The metal oxide semiconductor fine particles used in this embodiment may be the same as those described above in the paragraph "A. Dye-Sensitized Solar Cell", and therefore a description thereof is omitted here.

The binder resin used in the coating liquid for forming a porous layer is not particularly limited as long as it is decomposed by burning. Examples of such a binder rein include a cellulose-based resin, a polyester-based resin, a polyamide-based resin, a polyacrylic acid ester-based resin, a polyacrylic resin, a polycarbonate resin, a polyurethane resin, a polyolefin-based resin, a polyvinyl acetal-based resin, a fluorine-based resin, a polyimide resin, and polyhydric alcohols such as polyethylene glycol.

The solvent used in the coating liquid for forming a porous layer is not particularly limited as long as it can dissolve or disperse a desired amount of the binder resin. Examples of such a solvent include water and various solvents such as methanol, ethanol, isopropyl alcohol, propylene glycol monomethyl ether, terpineol, dichloromethane, acetone, acetonitrile, ethyl acetate, and tert-butyl alcohol.

A method for applying the coating liquid for forming a porous layer is not particularly limited as long as the coating liquid for forming a porous layer can be uniformly applied in a pattern onto a metal foil to a desired film thickness, and may be the same as a general coating method. Examples of such a conventional coating method include die coating, gravure coating, gravure reverse coating, roll coating, reverse roll coating, bar coating, blade coating, knife coating, air-knife coating, slot die coating, slide die coating, dip coating, microbar coating, microbar reverse coating, offset coating, and screen printing (rotary type).

In this embodiment, the film thickness of the coating film for forming a porous layer formed on a metal foil is not particularly limited as long as a porous layer having a desired film thickness can be formed, but is preferably in the range of 0.5 μm to 50 μm, more preferably in the range of 2 μm to 30 μm, and particularly preferably in the range of 5 μm to 20 μm. If the film thickness of the coating film for forming a porous layer is less than the above lower limit or exceeds the above upper limit, it is difficult to form a porous layer having a desired film thickness.

In this embodiment, the coating film for forming a porous layer may be pressurized before it is burned. This is because by pressurizing the coating film for forming a porous layer, it is possible to enhance the adhesion between the resulting porous layer and the base material for dye-sensitized solar cell. A method for pressurizing the coating film for forming a porous layer may be the same as that used for producing a conventional dye-sensitized solar cell, and therefore a description thereof is omitted here.

In this embodiment, a method for burning the coating film for forming a porous layer is not particularly limited as long as the coating film for forming a porous layer can be evenly burned without uneven heating, and a well-known burning method can be used.

In this embodiment, the temperature of burning is not particularly limited as long as the binder rein contained in the coating film for forming a porous layer can be thermally decomposed, and is appropriately determined depending on the pyrolysis temperature of the binder resin used. However, the temperature of burning is preferably in the range of 250 to 550° C., more preferably in the range of 350 to 550° C., and particularly preferably in the range of 400 to 550° C.

A method for adhering the dye sensitizer used in this embodiment to the surface of the layer for forming a porous layer is not particularly limited as long as the dye sensitizer can receive sunlight in a dye-sensitized solar cell produced using a porous layer formed by the porous layer forming method of this embodiment, and may be the same as that used for producing a general dye-sensitized solar cell.

The dye sensitizer used in this embodiment maybe the same as that described above in the paragraph "A. Dye-Sensitized Solar Cell", and therefore a description thereof is omitted here.

(2) Fourth Embodiment

This embodiment of the porous layer forming method is a method in which a porous layer is formed by applying a composition for forming a porous layer in a pattern onto the base material for dye-sensitized solar cell. In this embodiment, heat treatment may be performed at a temperature equal to or lower than the upper temperature limit of heat resisting temperature of the base material for dye-sensitized solar cell (hereinafter, sometimes simply referred to as "heat treatment").

The base material for dye-sensitized solar cell used in this embodiment may be either one composed of a metal foil or one composed of a base material and a first electrode layer provided on the base material. Examples of the base material include a thin glass base material and a resin film.

The counter electrode base material to be prepared may be either one having transparency or one not having transparency as long as at least one of the base material for dye-sensitized solar cell and the counter electrode base material has transparency.

In the porous layer forming method of this embodiment, a layer for forming a porous layer is first formed by applying and drying a composition for forming a porous layer containing metal oxide semiconductor fine particles and a solvent, and then a dye sensitizer is adhered to the layer for forming a porous layer to form a porous layer.

The metal oxide semiconductor fine particles used in the composition for forming a porous layer may be the same as those described above in the paragraph "A. Dye-Sensitized Solar Cell", and therefore a description thereof is omitted here.

The solvent is not particularly limited as long as it can disperse the metal oxide semiconductor fine particles, can dissolve or disperse a resin component, and can be removed by natural drying or heat treatment. Examples of such a solvent include, but not limited to, water, ethanol, isopropyl alcohol, ethyl acetate, methyl ethyl ketone, cyclohexanone, toluene, and xylene. These solvents may be used in combination of two or more of them. From the viewpoint of the effects of volatile matter on the environment after film formation, water or an alcohol-based solvent is more preferably used.

A method for applying the composition for forming a porous layer and the film thickness of a coating film obtained by applying the composition for forming a porous layer are not particularly limited as long as a porous layer having a desired film thickness can be uniformly formed on the base material for dye-sensitized solar cell, and may be the same as the method for applying a coating liquid for forming a porous layer and the film thickness of a coating film for forming a porous layer described above in the section "(1) Third Embodiment", and therefore a description thereof is omitted here.

The dye sensitizer used in this embodiment and a method for adhering the dye sensitizer onto the layer for forming a porous layer may be the same as those described above in the section "(1) Third Embodiment", and therefore a description thereof is omitted here.

(3) Fifth Embodiment

This embodiment of the porous layer forming method is a method (transfer method) in which a porous layer is formed on a heat-resistant substrate by burning, is then placed on the base material for dye-sensitized solar cell, and then the heat-resistant substrate is removed.

The porous layer forming method of this embodiment is not particularly limited as long as a porous layer can be formed on a heat-resistant substrate by burning and placed on the base material for dyes-sensitized solar cell. However, it is preferred that the heat-resistant substrate is removed after a first electrode layer is formed on the porous layer and a base material is bonded to the first electrode layer. This makes it possible to produce a dye-sensitized solar cell excellent in adhesion between the porous layer and the base material for dye-sensitized solar cell.

From the above viewpoint, the base material for dye-sensitized solar cell used in this embodiment is preferably composed of a base material and a first electrode layer provided on the base material. The counter electrode base material to be prepared may be either one having transparency or one not having transparency as long as at least one of the base material for dye-sensitized solar cell and the counter electrode base material has transparency.

The heat-resistant substrate used in this embodiment is not particularly limited as long as it has desired heat resistance. However, high-temperature burning treatment is commonly performed when a porous layer is formed on the heat-resistant substrate, and therefore the heat-resistant substrate used in this embodiment preferably has heat resistance to withstand a heating temperature during such burning treatment for forming a porous layer. Such a heat-resistant substrate may be the same as that used for producing a general dye-sensitized solar cell, and therefore a description thereof is omitted here.

A method for forming a porous layer on the heat-resistant substrate may be the same as that used in the section "(1) Third Embodiment" for forming a porous layer on a metal foil, and therefore a description thereof is omitted here.

In this embodiment, a method for forming a first electrode layer on the porous layer is not particularly limited as long as a first electrode layer having a desired film thickness can be uniformly formed on the porous layer, and may be the same as a general method for forming an electrode layer, and therefore a description thereof is omitted here. The material of the first electrode layer used in this embodiment maybe the same as that described above in the paragraph "A. Dye-Sensitized Solar Cell", and therefore a description thereof is omitted here.

In this embodiment, a method for bonding a base material onto the first electrode layer is not particularly limited as long as a desired adhesive force between the base material and the first electrode layer bonded together can be achieved. Usually, the base material and the first electrode layer are bonded together with an adhesive layer provided therebetween.

The adhesive layer may be the same as that used for producing a general dye-sensitized solar cell, and therefore a description thereof is omitted here.

A method for removing the heat-resistant substrate is not particularly limited as long as the heat-resistant substrate can be removed without damaging the porous layer, and a conventional removal method can be used. In this step, the heat-resistant substrate may be removed by mechanical polishing or chemical removal such as etching.

(4) Others

When this step is performed after the insulating layer-forming step (which will be described later), for example as shown in FIG. 7A, the porous layer may be provided on part of the insulating layer. The insulating layer (which will be described later) is not particularly limited as long as it is formed so as to prevent electrical contact between the base material for dye-sensitized solar cell and the counter electrode base material in a dye-sensitized solar cell produced by the production method according to the present invention. Therefore, formation of the porous layer on the porous layer-forming region where the insulating layer is not provided does not require high positional accuracy, and therefore the porous layer can be easily formed.

2. Solid Electrolyte Layer-Forming Step

This step is a step of forming a solid electrolyte layer so as to come into contact with the porous layer.

In this step, a method for forming a solid electrolyte layer is not particularly limited as long as a solid electrolyte layer having a desired film thickness can be formed on the porous layer so as to come into contact with the porous layer. Examples of such a method include: one in which a composition for forming a solid electrolyte layer is prepared by dispersing or dissolving a polymer component, a redox couple electrolyte, and an additive such as a cross-linking agent or a photopolymerization initiator in an appropriate solvent, applied onto the porous layer in a pattern, and cured by irradiation with active light rays; one in which a solid electrolyte layer is separately formed as a solid polymer film and then placed on the porous layer; and one in which a solid electrolyte layer is formed on the counter electrode base material and then the counter electrode base material and the base material for dye-sensitized solar cell having a porous layer provided thereon are bonded together such that the solid electrolyte layer comes into contact with the porous layer.

In this step, a solid electrolyte layer is particularly preferably formed by applying the composition for forming a solid electrolyte layer onto the porous layer in a pattern. This makes it easier to form a solid electrolyte layer as compared to a method in which a base material for dye-sensitized solar cell and a counter electrode base material are sealed with a sealant and then a solid electrolyte layer is formed by injecting a solid electrolyte layer material.

The polymer component and the redox couple electrolyte may be the same as those described above in the paragraph "A. Dye-Sensitized Solar Cell", and therefore a description thereof is omitted here. Further, other components used in the composition for forming a solid electrolyte layer may be the same as those used for forming a general solid electrolyte layer, and therefore a description thereof is omitted here.

Others relating to the solid electrolyte layer may be the same as those described above in the paragraph "A. Dye-Sensitized Solar Cell", and therefore a description thereof is omitted here.

3. Insulating Layer-Forming Step

This step is a step of forming an insulating layer on the surface of at least one of the base material for dye-sensitized solar cell and the counter electrode base material in a region which surrounds a region corresponding to the porous layer-forming region where the porous layer is formed and which is where the base material for dye-sensitized solar cell and the counter electrode base material are opposed to each other when they are bonded together.

In this step, a method for forming an insulating layer is not particularly limited as long as an insulating layer can be formed so as to prevent the occurrence of an internal short circuit in a dye-sensitized solar cell produced by the dye-sensitized solar cell production method according to the present invention. Examples of such an insulating layer forming method include: one in which an insulating layer is formed by applying a composition for forming an insulating layer in a pattern on at least one of the base material for dye-sensitized solar cell and the counter electrode base material; one in which an insulating layer is formed by adhering a tape having insulating properties to at least one of the base material for dye-sensitized solar cell and the counter electrode base material; one in which an insulating layer is formed by interposing an insulating layer material (e.g., a polymer film) between the base material for dye-sensitized solar cell having a porous layer provided thereon and the counter electrode base material having a solid electrolyte layer provided thereon, which are opposed to each other so that the porous layer and the solid electrolyte layer are interposed therebetween, and then bonding together the base material for dye-sensitized solar cell and the counter electrode base material by pressure bonding; and one in which an insulating layer is formed by forming a vapor-deposited insulating film, such as $SiO_2$, on at least one of the base material for dye-sensitized solar cell and the counter electrode base material by vapor deposition, sputtering, CVD, or the like.

In this step, an insulating layer is preferably formed by applying the composition for forming an insulating layer in a pattern on at least one of the base material for dye-sensitized solar cell and the counter electrode base material or by using a tape having insulating properties. This makes it easy to form an insulating layer.

It is to be noted that the composition for forming an insulating layer contains the material of an insulating layer described above in the paragraph "A. Dye-Sensitized Solar Cell", and the tape having insulating properties contains the material of an insulating layer described above in the paragraph "A. Dye-Sensitized Solar Cell" and has desired width and thickness.

The insulating material (polymer film) may be either one containing the material of an insulating layer described above in the paragraph "A. Dye-Sensitized Solar Cell" and having or not having heat sealability or one containing the material of an insulating layer described above in the paragraph "A. Dye-Sensitized Solar Cell" and having or not having tackiness.

A method for applying the composition for forming an insulating layer in a pattern may be the same as a general pattern application method, and is particularly preferably a printing method, an inkjet method, a dispenser method, die coating, gravure coating, gravure reverse coating, offset coating, or screen printing (rotary type).

The method for forming an insulating layer by using a tape having insulating properties is not particularly limited as long as the tape can be adhered to a predetermined position on the base material for dye-sensitized solar cell or the counter electrode base material, and may be the same as a general tape adhering method, and therefore a description thereof is omitted here.

The insulating layer formed in this step is not particularly limited as long as it can prevent electrical contact between the base material for dye-sensitized solar cell and the counter electrode base material in a region surrounding the porous layer in a dye-sensitized solar cell produced by the production method according to the present invention. However, the insulating layer formed in this step is more preferably formed such that a dye-sensitized solar cell produced by the production method according to the present invention can have an external communication portion that leads from the porous layer-forming region where the porous layer is formed, to the outside of the dye-sensitized solar cell. This is because in the bonding step (which will be described later), air in the dye-sensitized solar cell can be discharged through the external communication portion when the base material for dye-sensitized solar cell and the counter electrode base material are bonded together, which allows the dye-sensitized solar cell to be easily produced.

It is to be noted that the external communication portion may be the same as that described above in the paragraph "A. Dye-Sensitized Solar Cell", and therefore a description thereof is omitted here.

In this step, as shown in FIGS. 1A and 1B, the insulating layer may be continuously formed, or as shown in FIG. 6, the insulating layer may be composed of islands spaced apart from one another without causing an internal short circuit in a dye-sensitized solar cell produced by the dye-sensitized solar cell production method according to the present invention.

Matters relating to the insulating layer formed in this step are the same as those described above in the paragraph "A. Dye-Sensitized Solar Cell", and therefore a description thereof is omitted here.

4. Bonding Step

This step is a step of bonding together the base material for dye-sensitized solar cell and the counter electrode base material opposed to each other with the porous layer and the solid electrolyte layer being interposed therebetween.

In this step, the base material for dye-sensitized solar cell and the counter electrode base material opposed to each other are bonded together with the porous layer and the solid electrolyte layer being interposed therebetween after the porous layer-forming step, the solid electrolyte layer-forming step, and the insulating layer-forming step. This makes it possible to produce a dye-sensitized solar cell on a single production line and therefore to improve production efficiency.

A method for bonding together the base material for dye-sensitized solar cell and the counter electrode base material used in this step is not particularly limited as long as the base material for dye-sensitized solar cell and the counter electrode base material opposed to each other can be bonded together with the porous layer and the solid electrolyte layer being interposed therebetween, and may be the same as that used in a method for producing a general dye-sensitized solar cell.

5. Other Steps

The dye-sensitized solar cell production method according to the present invention is not particularly limited as long as it includes the above-described bonding step, but if necessary, may include another step. An example of such another step is a step of cutting a dye-sensitized solar cell fabricated in the bonding step into desired sizes. According to the present invention, a solid electrolyte is used, and therefore the fabricated dye-sensitized solar cell can be cut into desired sizes.

The dye-sensitized solar cell production method according to the present invention may include, for example, a catalyst layer forming step for forming a catalyst layer on the counter electrode base material. A method for forming the catalyst layer may be the same as that used for producing a general dye-sensitized solar cell, and therefore a description thereof is omitted here.

6. Others

According to the present invention, it is preferred that: the porous layer is formed by applying a composition for forming a porous layer in a pattern onto the base material for dye-sensitized solar cell in the porous layer-forming step; the solid electrolyte layer is formed by applying a composition for forming a solid electrolyte layer in a pattern onto the porous layer in the solid electrolyte layer-forming step; and the insulating layer is formed by applying a composition for forming an insulating layer in a pattern onto at least one of the base material for dye-sensitized solar cell and the counter electrode base material in the insulating layer-forming step. This makes it possible to produce the dye-sensitized solar cell according to the present invention on a single production line, thereby improving production efficiency. Further, since both the base material for dye-sensitized solar cell and the counter electrode base material used in the present invention have flexibility, by performing all these steps by an application method, it is possible to reduce loads applied to the base material for dye-sensitized solar cell and the counter electrode base material as compared to a case where these members are formed using a tape or the like, thereby preventing a reduction in processing accuracy.

Further, the dye-sensitized solar cell production method according to the present invention also makes it possible to mass-produce a dye-sensitized solar cell by using a multifaceted member, such as one shown in FIG. 3, 4, or 5, having two or more dye-sensitized solar cells formed.

An example of such a method for producing a dye-sensitized solar cell by using a multifaceted member includes one in which, two or more each of the members necessary to produce two or more dye-sensitized solar cells are formed in the above-mentioned porous layer-forming step, solid electrolyte layer-forming layer, and insulating layer-forming step, and then the base material for dye-sensitized solar cell and the counter electrode base material having these members formed thereon are bonded together in the above-mentioned bonding step to prepare a multifaceted member having two or more dye-sensitized solar cells formed, and then the multifaceted member is cut at predetermined cutting positions.

The porous layer-forming step, the solid electrolyte layer-forming step, and the insulating layer-forming step used in the method for producing two or more dye-sensitized solar cells by using a multifaceted member are not particularly limited as long as a multifaceted member having two or more desired dye-sensitized solar cells produced can be prepared. However, as described above, all the porous layer-forming step, the solid electrolyte layer-forming step, and the insulating layer-forming step are preferably performed by a pattern application method. This makes it possible to perform these steps and the bonding step on a single production line to prepare a multifaceted member, which makes it possible to improve production efficiency and to prevent a reduction in processing accuracy as compared to a case where each of the members is formed using a tape or the like.

Further, the mass-production of a dye-sensitized solar cell can be achieved by preparing a multifaceted member by, for example, a Roll-to-Roll method and cutting the multifaceted member, which makes it possible to produce a dye-sensitized solar cell at low cost.

It is to be noted that the present invention is not limited to the above embodiments. The above embodiments are merely illustrative, and those that have substantially the same structure as the technical concept described in the claims of the present invention and demonstrate the same functions and effects are all included in the technical scope of the present invention.

EXAMPLES

Hereinbelow, the present invention will be more specifically described with reference to the following examples.

Example 1

A titanium foil was prepared as a base material for dye-sensitized solar cell. A transparent conductive film obtained by forming an ITO film on a PEN film was prepared as a counter base material, and a counter electrode base material was prepared by laminating platinum with a thickness of 13 Å (transmittance 72%) on the ITO film.

(Porous Layer-Forming Step)

A coating liquid for forming a porous layer was prepared by adding 5% (solid ratio) of ethyl cellulose (ST-100™ manufactured by Nissin Kasei Kogyo Co., Ltd.) as a polymer component to a dispersion liquid obtained by dispersing P25™ (manufactured by Nippon Aerosil Co., Ltd.) in ethanol. The coating liquid for forming a porous layer was applied with a doctor blade onto the titanium foil in an area of 10 mm×10 mm and dried at 120° C. to obtain a 6 μm-thick coating film for forming a porous layer. A pressure of 0.1 t/cm was applied onto the coating film for forming a porous layer with a pressing machine. The reason for adding the polymer component is to prevent the coating film for forming a porous layer from clinging to a roll during pressing. After the completion of pressing, the coating film for forming a porous layer was burned at 500° C. to obtain a layer for forming a porous layer. Then, the layer for forming a porous layer was immersed for 20 hours in a dye solution obtained by dissolving a ruthenium complex ($RuL_2(NCS)_2$ manufactured by Solaronix SA) in anhydrous ethanol to achieve a concentration of $3.0 \times 10^{-4}$ mol/L. After the completion of immersion, the layer for forming a porous layer was pulled out of the dye solution, washed with acetonitrile to remove the dye solution adhered thereto, and air-dried. In this way, a dye-sensitizer-supported porous layer was obtained.

(Solid Electrolyte Layer-Forming Step)

10.0 g of PMIm-I and 0.24 g of $I_2$ were added to and dissolved in 3.64 g of $EMIm-B(CN)_4$ with stirring to obtain a solution. Then, 28 g of a 5 wt % methanol solution of cationic hydroxyl cellulose (Jellner QH-200™ manufactured by Daicel Corporation) was added to the solution with stirring to prepare a coatable composition for forming a solid electrolyte layer.

Then, the composition for forming a solid electrolyte layer was applied with a doctor blade onto the same region as a region where the porous layer of the base material for dye-sensitized solar cell was formed, and was then dried at 100° C. to provide a 4 μm-thick solid electrolyte layer.

(Insulating Layer-Forming Step and Bonding Step)

Then, a 12 μm-thick PET film (Lumirror T-25™ manufactured by Toyobo Co., Ltd.) was provided as an insulating layer so as to be interposed between the base material for dye-sensitized solar cell and the counter electrode base material in a region where the porous layer was not formed and the base material for dye-sensitized solar cell and the counter electrode base material overlapped one another (in the region of the insulating layer 5 shown in FIG. 1A), and then the base material for dye-sensitized solar cell and the counter electrode base material were arranged so as to oppose to each other. Then, the base material for dye-sensitized solar cell and the counter electrode base material were pressure-bonded by heat sealing at 120° C. using a 40 μm-thick OPP film (P3162™ manufactured by Toyobo Co., Ltd.) externally attached thereto. In this way, a dye-sensitized solar cell was obtained Example 2

A dye-sensitized solar cell was obtained in the same manner as in Example 1 except that a 15 μm-thick double-faced tape (400P15™ manufactured by KGK Kyodo Giken Chemical Co., Ltd.) was used in the insulating layer-forming step.

Example 3

A dye-sensitized solar cell was obtained in the same manner as in Example 1 except that the area of the base material for dye-sensitized solar cell was 10 mm×40 mm and the insulating layer was provided at the position of the insulating layer 5 shown in FIG. 3. Then, as shown in FIG. 3, 10 mm×10 mm dye-sensitized solar cells were obtained by cutting the dye-sensitized solar cell at cutting positions on the insulting layer.

Example 4

A dye-sensitized solar cell was obtained in the same manner as in Example 1 except that the porous layer was formed by applying the coating liquid for forming a porous layer in a pattern onto a 30 mm×30 mm titanium foil in four 10 mm×10 mm areas and the insulating layer was provided at the position of the insulating layer 5 shown in FIG. 5. Then, as shown in FIG. 5, 10 mm×10 mm dye-sensitized solar cells were obtained by cutting the dye-sensitized solar cell at cutting positions on the insulating layer.

Example 5

A transparent conductive film obtained by forming an ITO film on a PEN film was prepared as a base material for dye-sensitized solar cell. The base material for dye-sensitized solar cell had an area of 10 mm×40 mm. A counter electrode base material was prepared by laminating platinum with a thickness of 13 Å (transmittance 72%) on a titanium foil used as a counter base material.

The above-described coating liquid for forming a porous layer was applied by a doctor blade method onto the surface of the ITO film of the base material for dye-sensitized solar cell, and was then dried at 120° C. for 5 minutes to obtain a 4 μm-thick coating film for forming a porous layer. Then, the layer for forming a porous layer (coating liquid for forming a porous layer) was immersed for 20 hours in a dye solution obtained by dissolving a ruthenium complex ($RuL_2(NCS)_2$ manufactured by Solaronix SA) in anhydrous ethanol to achieve a concentration of $3.0 \times 10^{-4}$ mol/L. After the completion of immersion, the layer for forming a porous layer was pulled out of the dye solution, washed with acetonitrile to remove the dye solution adhered thereto, and air-dried. In this way, a dye-sensitizer-supported porous layer was obtained.

Then, the above-described composition for forming a solid electrolyte layer was applied with a doctor blade onto the same region as a region where the porous layer of the base material for dye-sensitized solar cell was formed, and was then dried at 100° C. to provide a 4 μm-thick solid electrolyte layer.

Then, a dry lamination adhesive (manufactured by Toyo Ink Group, adhesive AD-76PI™/curing agent CAT-RT85™=100/7) was applied with a doctor blade onto a region where the porous layer was not provided and the base material for dye-sensitized solar cell and the counter electrode base material overlapped one another (onto the region of the insulating layer 5 shown in FIG. 3) and dried at 100° C. to provide a 8 μm-thick insulating layer. The base material for dye-sensitized solar cell and the counter electrode base material were arranged so as to oppose to each other and bonded together, and were then subjected to aging at 50° C. for 7 days.

Then, similarly to Example 3, the thus obtained dye-sensitized solar cell was cut at cutting positions shown in FIG. 3 to obtain 10 mm×10 mm dye-sensitized solar cells.

Comparative Example 1

A dye-sensitized solar cell was produced in the same manner as in Example 1 except that the insulating layer was omitted.

Comparative Example 2

Dye-sensitized solar cells were produced in the same manner as in Example 4 except that the insulating layer was omitted.

[Evaluation]

The current-voltage characteristics of each of the dye-sensitized solar cells produced in Examples 1 to 5 and Comparative Examples 1 and 2 were measured by application of a voltage with the use of AM 1.5 artificial sunlight (intensity of incident light: 100 mW/cm$^2$) as a light source and a source measure unit (Keithley 2400 type).

The dye-sensitized solar cells produced in Examples 1 to 5 did not cause a short circuit and generated electric power without problems. On the other hand, all the dye-sensitized solar cells produced in Comparative Examples 1 and 2 caused a short circuit.

REFERENCE SIGNS LIST

1 Base material for dye-sensitized solar cell
1a Base material
1b First electrode layer
2 Counter electrode base material
2a Counter base material
2b Second electrode layer
3 Solid electrolyte layer
4 Porous layer
5 Insulating layer
10 Dye-sensitized solar cell
20 Multifaceted member
30 Dye-sensitized solar cell module

The invention claimed is:

1. A dye-sensitized solar cell comprising:
a base material for the dye-sensitized solar cell that functions as an electrode, has flexibility, and has a porous layer, containing a dye-sensitizer-supported fine particle of a metal oxide semiconductor, provided on one surface of the base material for the dye-sensitized solar cell;
a counter electrode base material that is arranged so as to oppose the base material for the dye-sensitized solar cell, functions as an electrode, and has flexibility; and
a solid electrolyte layer that is provided between the base material for the dye-sensitized solar cell and the counter electrode base material so as to come into contact with the porous layer,
wherein at least one of the base material for the dye-sensitized solar cell and the counter electrode base material has transparency; at least one of the base material for the dye-sensitized solar cell and the counter electrode base material has an insulating layer provided on a surface thereof; the insulating layer is provided in a region which surrounds a porous layer-forming region where the porous layer is formed, and which is where the base material for the dye-sensitized solar cell and the counter electrode base material are opposed to each other; the insulating layer has an external communication portion that leads from an inside of the porous layer-forming region to outside; and the external communication portion is a void space which is directly between the insulating layer and one of the base material for the dye-sensitized solar cell and the counter electrode base material.

2. The dye-sensitized solar cell according to claim 1, wherein the base material for the dye-sensitized solar cell is composed of a metal foil and the counter electrode base material has transparency.

3. The dye-sensitized solar cell according to claim 1, wherein the insulating layer has a tackiness of 100 mN/25 mm or larger.

4. The dye-sensitized solar cell according to claim 1, wherein the porous layer-forming region is quadrilateral and the insulating layer is provided along two opposite sides of the porous layer-forming region.

5. A dye-sensitized solar cell module comprising two or more of the dye-sensitized solar cell according to claim 1 connected together.

* * * * *